(12) United States Patent
Nakano et al.

(10) Patent No.: US 9,362,995 B2
(45) Date of Patent: Jun. 7, 2016

(54) TRANSMITTER APPARATUS, RECEIVER APPARATUS, COMMUNICATION SYSTEM, COMMUNICATION METHOD, AND INTEGRATED CIRCUIT

(75) Inventors: Hiroshi Nakano, Osaka (JP); Hiromichi Tomeba, Osaka (JP); Takashi Onodera, Osaka (JP); Alvaro Ruiz Delgado, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 307 days.

(21) Appl. No.: 14/002,142

(22) PCT Filed: Jan. 30, 2012

(86) PCT No.: PCT/JP2012/051923
§ 371 (c)(1),
(2), (4) Date: Aug. 29, 2013

(87) PCT Pub. No.: WO2012/117788
PCT Pub. Date: Sep. 7, 2012

(65) Prior Publication Data
US 2013/0336282 A1    Dec. 19, 2013

(30) Foreign Application Priority Data
Mar. 1, 2011    (JP) .................................. 2011-043755

(51) Int. Cl.
*H04W 4/00*    (2009.01)
*H04B 7/04*    (2006.01)
(Continued)

(52) U.S. Cl.
CPC ............ *H04B 7/0452* (2013.01); *H04B 7/0456* (2013.01); *H04L 5/005* (2013.01); *H04L 25/0204* (2013.01); *H04L 25/0226* (2013.01); *H04L 25/0242* (2013.01);
(Continued)

(58) Field of Classification Search
CPC ..................................................... H04B 7/0452
USPC ......................................................... 370/330
See application file for complete search history.

(56) References Cited

U.S. PATENT DOCUMENTS

2007/0064786 A1* 3/2007 Akahori ................ H04L 25/022
375/229
2007/0066268 A1* 3/2007 Simic .................... G01S 19/235
455/318

(Continued)

FOREIGN PATENT DOCUMENTS

| JP | 2009-182894 A | 8/2009 |
| WO | 2010/053059 A1 | 5/2010 |

(Continued)

OTHER PUBLICATIONS

Official Communication issued in International Patent Application No. PCT/JP2012/051923, mailed on Feb. 21, 2012.
(Continued)

*Primary Examiner* — Gerald Smarth
(74) *Attorney, Agent, or Firm* — Keating & Bennett, LLP

(57) ABSTRACT

A transmitter apparatus to transmit to a plurality of receiver apparatuses a data signal at the same timing and on the same frequency, includes a transmitter unit that transmits a demodulation reference signal addressed to a first receiver apparatus and a demodulation reference signal addressed to a second receiver apparatus different from the first receiver apparatus at the same timing and on the same frequency.

6 Claims, 16 Drawing Sheets

(51) Int. Cl.
*H04L 5/00* (2006.01)
*H04L 25/02* (2006.01)
*H04L 25/06* (2006.01)
*H04J 11/00* (2006.01)

(52) U.S. Cl.
CPC .......... *H04L 25/067* (2013.01); *H04B 7/0465* (2013.01); *H04J 11/003* (2013.01)

(56) References Cited

U.S. PATENT DOCUMENTS

| | | | | |
|---|---|---|---|---|
| 2010/0195599 | A1* | 8/2010 | Zhang | H04L 5/0094 370/329 |
| 2010/0260288 | A1 | 10/2010 | Aoki et al. | |
| 2010/0323684 | A1* | 12/2010 | Cai | H04B 7/2606 455/422.1 |
| 2011/0244816 | A1 | 10/2011 | Mori et al. | |
| 2012/0155345 | A1 | 6/2012 | Mori et al. | |
| 2013/0003641 | A1 | 1/2013 | Nakano et al. | |
| 2013/0064150 | A1* | 3/2013 | Hirata | H04B 7/0665 370/310 |

FOREIGN PATENT DOCUMENTS

| | | |
|---|---|---|
| WO | 2010/150313 A1 | 12/2010 |
| WO | 2011/108319 A1 | 9/2011 |

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)", Dec. 2009, 2 pages.

Hochwald et al., "A Vector-Perturbation Technique for Near-Capacity Multiantenna Multiuser Communication—Part II: Perturbation", IEEE Transactions on Communications, vol. 53, No. 3 Mar. 2005, pp. 537-544.

Liu et al., "Low Complexity Lattice Reduction Aided MMSE Precoding Design for MIMO Systems", Proceedings of ICC 2007, Jun. 2007, pp. 2598-2603.

* cited by examiner

FIG. 12
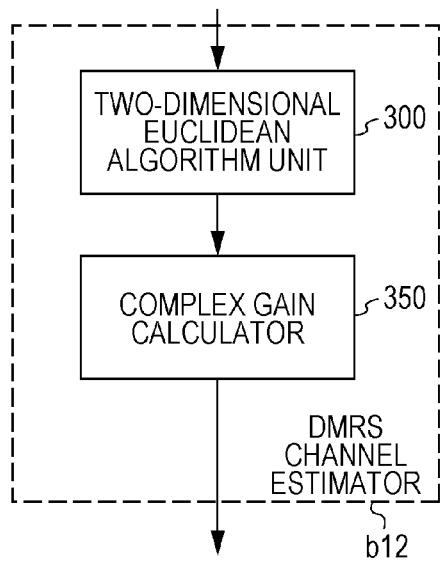
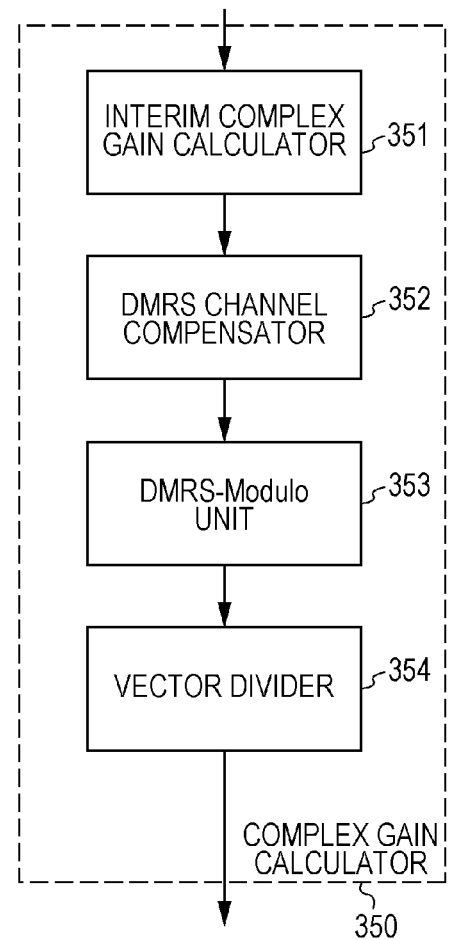

TRANSMITTER APPARATUS, RECEIVER APPARATUS, COMMUNICATION SYSTEM, COMMUNICATION METHOD, AND INTEGRATED CIRCUIT

TECHNICAL FIELD

The present invention relates to a transmitter apparatus, a receiver apparatus, a communication system, a communication method, and an integrated circuit.

BACKGROUND ART

MIMO

Many studies have been made to increase frequency efficiency to increase the speed of wireless data communication within a limited frequency band. Among them, MIMO (Multi-Input Multi-Output) technique to increase transmission capacity per unit frequency with a plurality of antennas used concurrently gains attention.

LP MU-MIMO

MIMO includes Single-User MIMO (SU-MIMO) in which a base-station (BS) apparatus transmits a plurality of signals to a single mobile-station (MS) device at the same timing and on the same frequency, and Multi-User MIMO (MU-MIMO) in which a base station transmits a signal to different mobile-station devices at the same timing and on the same frequency.

Since SU-MIMO is unable to multiplex streams more than the number of antennas of a mobile-station device, the maximum number of streams is limited by the number of physical antennas of the mobile-station device. On the other hand, since a base-station apparatus is able to have antennas more than the number of antennas of the mobile-station device, MU-MIMO becomes necessary in order to make the most use of idling antennas of the base-station apparatus. Specifications of down-link (DL) MU-MIMO using linear precoding (LP) have been formulated in LTE (long Term Evolution) and LTE-Advanced (see Non Patent Literature 1 below).

NLP MU-MIMO

In MU-MIMO based on LP (LP MU-MIMO), a base-station apparatus orthogonalizes transmit signals by performing a multiplexing operation on a linear filter, and thus removes Multi-User Interference (MUI) between mobile-station devices. This reduces a flexibility of combinations of mobile-station devices that can be spatial multiplexed.

On the other hand, Nonlinear Precoding (NLP) MU-MIMO is disclosed as another method to implement spatial multiplexing. In NLP MU-MIMO, a mobile-station device performs a modulo operation to treat, as the same point points, points to which a received signal is shifted in parallel by an integer multiple of a constant width (modulo width) in directions of an in-phase channel (I-ch) and a quadrature channel (Q-ch). In this way, the base-station apparatus can add to a modulation signal a signal of any integer multiple of the modulo width (perturbation vector), and reduces transmission power by appropriately selecting the perturbation vector and adding the selected perturbation vector to a signal addressed to each mobile-station device (see Non Patent Literature 2 below).

VP MU-MIMO

The mobile-station device performs the modulo operation on a received signal, and the base-station apparatus will have a freedom of adding to each modulation signal a signal of any integer multiple of the modulo width. The signal that can be added is referred to as a perturbation vector. VP (Vector Perturbation) MU-MIMO is a method of searching for a perturbation vector that increases power efficiency most, in view of channel states of all mobile-station devices that are spatial multiplexed. In VP MU-MIMO, the base-station apparatus has a large amount of calculation, but VP MU-MIMO is NLP MU-MIMO scheme that provides excellent characteristics with a full transmit diversity gain (see Non Patent Literature 2 below).

THP MU-MIMO

THP (Tomlinson-Harashima precoding) MU-MIMO is available and is a method different from VP MU-MIMO. THP MU-MIMO calculates a perturbation vector that is to be successively added to the signal addressed to each mobile-station device, in view of user interference each mobile-station device has suffered. In THP MU-MIMO, the complexity of a transmission process of the base-station apparatus is low but not all mobile-station devices may obtain full transmit diversity (see Non Patent Literature 3 below).

LR-THP

LR-THP is a method of THP MU-MIMO with a process called lattice reduction (LR) added thereto. LR-THP is a method that provides the full transmit diversity gain with an amount of calculation lower than the amount of calculation of VP MU-MIMO (see Non Patent Literature 3 below).

DMRS

In the NLP MU-MIMO system, a base-station apparatus needs to transmit DMRS (DeModulation Reference Signal) to each mobile-station device. However, if the base-station apparatus performs the same non-linear precoding operation as the data signal on DMRS and then transmits the DMRS, the mobile-station device is unable to estimate channels.

The DMRS is a signal that the base-station apparatus uses to notify each mobile-station device in advance of an amplitude and phase of the data signal on which the base-station apparatus has performed the precoding operation through NLP MU-MIMO. If a non-linear precoding operation is performed on the DMRS, the base-station apparatus adds a perturbation vector on the DMRS (or performs the modulo operation on the DMRS), and then transmits the DMRS. The mobile-station device needs to perform the modulo operation on the DMRS as well. For this reason, the mobile-station device needs to know a modulo width needed in the modulo operation in advance. Since the modulo width is proportional to the amplitude of the modulation signal in a received signal, the mobile-station device needs to know a reception gain of the data signal (a complex gain of a channel) subsequent to the non-linear precoding operation. However, the mobile-station device is unable to know the reception gain (the complex gain of the channel) without estimating channels using the DMRS. More specifically, the mobile-station device is in the situation that "the mobile-station device is unable to acquire the reception gain without estimating the channels using the DMRS, while being unable to estimate the channels using DMRS without knowing that reception gain". The above-described problem thus arises.

In the technique disclosed in Patent Literature 1, the DMRS is transmitted to each mobile-station device using orthogonal radio resources (regions divided in a time direction and in a frequency direction, and if different data signals and different reference signals are assigned to the regions, the regions do not mutually interfere with). In such a case, the mobile-station device is free from performing the modulo operation on the DMRS, and obtains the reception gain.

CITATION LIST

Patent Literature

PTL 1: Japanese Unexamined Patent Application Publication No. 2009-182894

Non Patent Literature

NPL 1: 3GPP Technical Specification 36.211 v8.9.0
NPL 2: B. M. Hochwald, C. B. Peel, A. L. Swindlehurst, "A Vector-Perturbation Technique for Near-Capacity Multi-antenna Multiuser Communication-Part II Perturbation," IEEE TRANSACTIONS ON COMMUNICATIONS, VOL. 53, NO. 3, PP. 537-544, March 2005
NPL 3: F. Liu, L. Jiang, C. He, "Low complexity lattice reduction aided MMSE precoding design for MIMO systems," Proceedings of ICC 2007, pp. 2598-2603, June 2007.

SUMMARY OF INVENTION

Technical Problem

In the method of arranging the DMRS addressed to each mobile-station device to the orthogonal radio resources as disclosed in PTL 1, the radio resources dedicated to the DMRS are needed for the number of mobile-station devices. The overhead involved in the insertion of the DMRS increases accordingly.

The present invention has been developed in view of the above problem, and it is an object of the present invention to provide a technique of estimating an amplitude and phase (a complex gain and a reception gain) of a data signal normally in the mobile-station device and minimizing an increase in the overhead involved in the insertion of the DMRS by spatial multiplexing DMRS in the NLP MU-MIMO system.

Solution to Problem

According to an aspect of the present invention, there is provided a transmitter apparatus to transmit to a plurality of receiver apparatuses a data signal at the same timing and on the same frequency. The transmitter apparatus includes a transmitter unit that transmits a demodulation reference signal addressed to a first receiver apparatus and a demodulation reference signal addressed to a second receiver apparatus different from the first receiver apparatus at the same timing and on the same frequency.

In the transmitter apparatus, the demodulation reference signals (DMRS) spatial multiplexed are transmitted to all mobile-station apparatuses using a single radio resource. A plurality of demodulation reference signals are transmitted to all the mobile-station apparatuses while enough radio resources are reserved to arrange the data signal. Each mobile-station apparatus (hereinafter referred to as a receiver apparatus) may perform a channel estimation operation using a plurality of demodulation reference signals. The present invention helps reduce the insertion loss of the demodulation reference signal.

The transmitter apparatus preferably includes a non-linear precoder that adds to the demodulation reference signal a signal that is an integer multiple of a predetermined signal. Also, the transmitter apparatus may include a non-linear precoder that performs a non-linear precoding operation on the demodulation reference signal.

Preferably, the transmitter unit transmits a plurality of data signals at the same timing and on the same frequency, and the non-linear precoder performs the same non-linear precoding operation, as the non-linear precoding operation performed on the data signal, the demodulation reference signal. In this way, the non-linear precoding operation is performed using the same filter as the filter used on the data signal on the same principle as the principle applied to the data signal.

The transmitter apparatus may include a DMRS corrector to correct the demodulation reference signal. The DMRS corrector preferably includes a two-dimensional Euclidean algorithm unit that performs a two-dimensional Euclidean algorithm operation on the demodulation reference signal. The two-dimensional Euclidean algorithm unit may include a difference vector calculator that subtracts from the first demodulation reference signal the second demodulation reference signal, a signal that results from rotating the second demodulation reference signal in phase by 90 degrees, a signal that results from rotating the second demodulation reference signal in phase by 180 degrees, and a signal that results from rotating the second demodulation reference signal in phase by 270 degrees.

The present invention relates to a receiver apparatus including a perturbation vector adder that adds to a demodulation reference signal a signal that is an integer multiple of a predetermined width. The receiver apparatus preferably includes an interim channel estimator that estimates a channel in accordance with the demodulation reference signal with the signal added thereto. The receiver may include a perturbation vector candidate selector that selects a plurality of different pieces of the signal and a perturbation vector estimator that selects one of the signals in accordance with a channel estimation result estimated by the interim channel estimator that estimates the channel using each of the signals. The receiver apparatus preferably includes a demodulator that calculates a logarithmic likelihood ratio by soft-estimating a data signal of each of the channel estimate results corresponding to the plurality of different pieces of the signal, and a perturbation vector evaluation value calculator that calculates a variance of each logarithmic likelihood ratio. The perturbation vector estimator selects the signal corresponding to the largest one of the variances. The receiver apparatus preferably includes a two-dimensional Euclidean algorithm unit that applies the two-dimensional Euclidean algorithm to a plurality of demodulation reference signals to calculate an irreducible vector. The receiver apparatus preferably includes a complex gain calculator that calculates a complex gain of a channel using the irreducible vector.

The present invention also relates to a communication system. The communication system includes a transmitter apparatus that includes a non-linear precoder that adds to a demodulation reference signal a signal that is an integer multiple of a predetermined signal, and a transmitter unit that transmits the demodulation reference signal and another signal at the same timing and on the same frequency, and a receiver apparatus that includes a perturbation vector adder that adds to the demodulation reference signal a signal that is an integer multiple of a predetermined width.

The present invention relates to a communication method. The communication method includes a transmission method that includes a step of adding to a demodulation reference signal a signal that is an integer multiple of a predetermined signal, and a step of transmitting the demodulation reference signal and another signal at the same timing and on the same frequency, and a reception method that includes a step of adding to the demodulation reference signal a signal that is an integer multiple of a predetermined width.

The present invention relates to an integrated circuit. The integrated circuit includes a non-linear precoder that adds to a demodulation reference signal a signal that is an integer multiple of a predetermined signal, and a transmitter unit that transmits the demodulation reference signal and another signal at the same timing and on the same frequency.

The present invention relates to an integrated circuit. The integrated circuit includes a perturbation vector adder that adds to a demodulation reference signal a signal that is an integer multiple of a predetermined width.

The present invention may include a program that causes elements to perform the communication method, and a computer-readable recording medium that has stored the program.

The description contains the contents of the specification and/or the drawings of Japanese Patent Application No. 2011-043755 which this application is based on and claims priority from.

BRIEF DESCRIPTION OF DRAWINGS

FIG. 12 illustrates a DMRS channel estimator (a) and a complex gain calculator (b).

DESCRIPTION OF EMBODIMENTS

Embodiments of the present invention are described in detail below with reference to the drawings.

First Embodiment

Variance Base of Logarithmic Likelihood Ratio

Communication System 1

Figure 1:
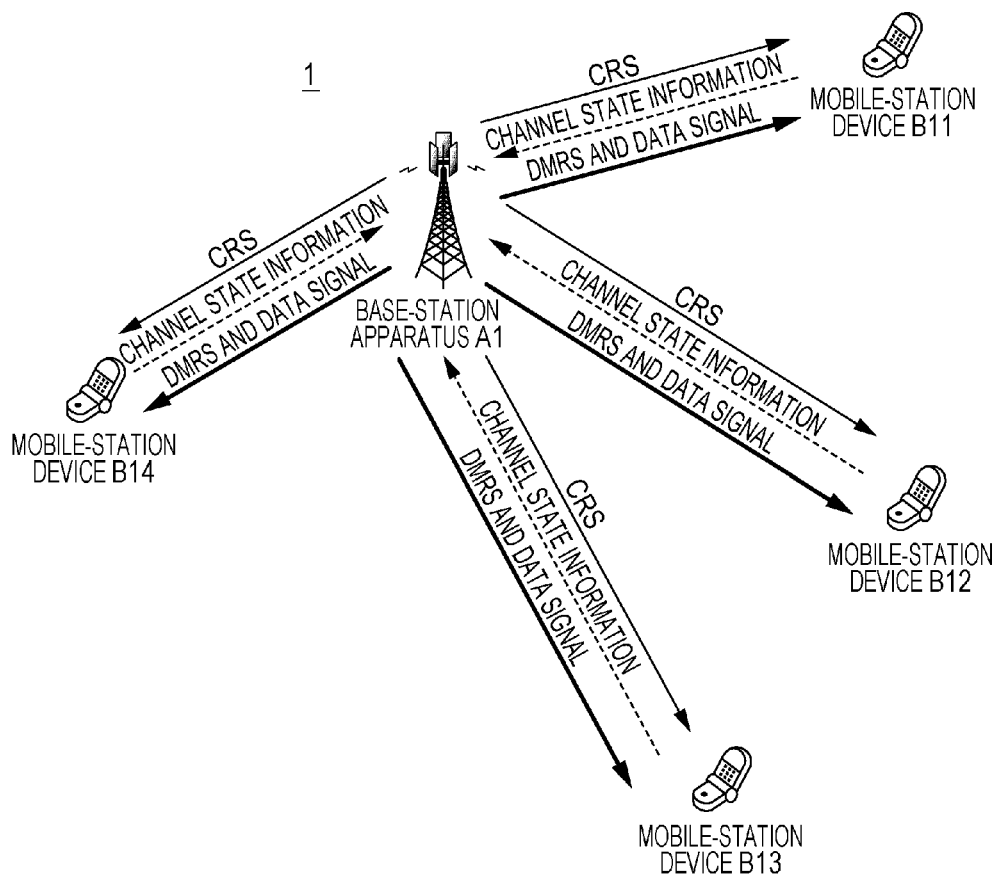
FIG. 1 illustrates a concept of a communication system of a first embodiment of the present invention.

FIG. 1 illustrates a concept of a communication system 1 of a first embodiment of the present invention. The communication system 1 includes a base-station apparatus A1, and mobile-station devices B11 through B1N (FIG. 1 illustrates an example in which the base-station apparatus A1 selects a first mobile-station device through a fourth mobile-station device B11, B12, B13, and B14 (N=4)).

The base-station apparatus A1 transmits a common reference signal (CRS). Note that a reference signal as the CRS is stored by the base-station apparatus A1 and the first through fourth mobile-station devices B11 through B14. Each of the first through fourth mobile-station devices B11 through B14 estimates a channel state based on the CRS transmitted by the base-station apparatus A1, and then notifies the base-station apparatus A1 of channel state information based on the estimated channel state.

The base-station apparatus A1 transmits DMRS and a data signal to the first through fourth mobile-station devices B11 through B14. In this case, the base-station apparatus A1 performs a precoding operation on the DMRS and the data signal, and then transmits the DMRS and data signal subsequent to multiplication.

In accordance with the DMRS received from the base-station apparatus A1, the first through fourth mobile-station devices B11 through B14 multiplexed estimate the channel state of an equivalent channel having a precoding operation treated as part thereof (hereinafter referred to as an equivalent channel) and acquires a data signal in accordance with equivalent channel state information indicating a channel state of the estimated equivalent channel.

Figure 2:
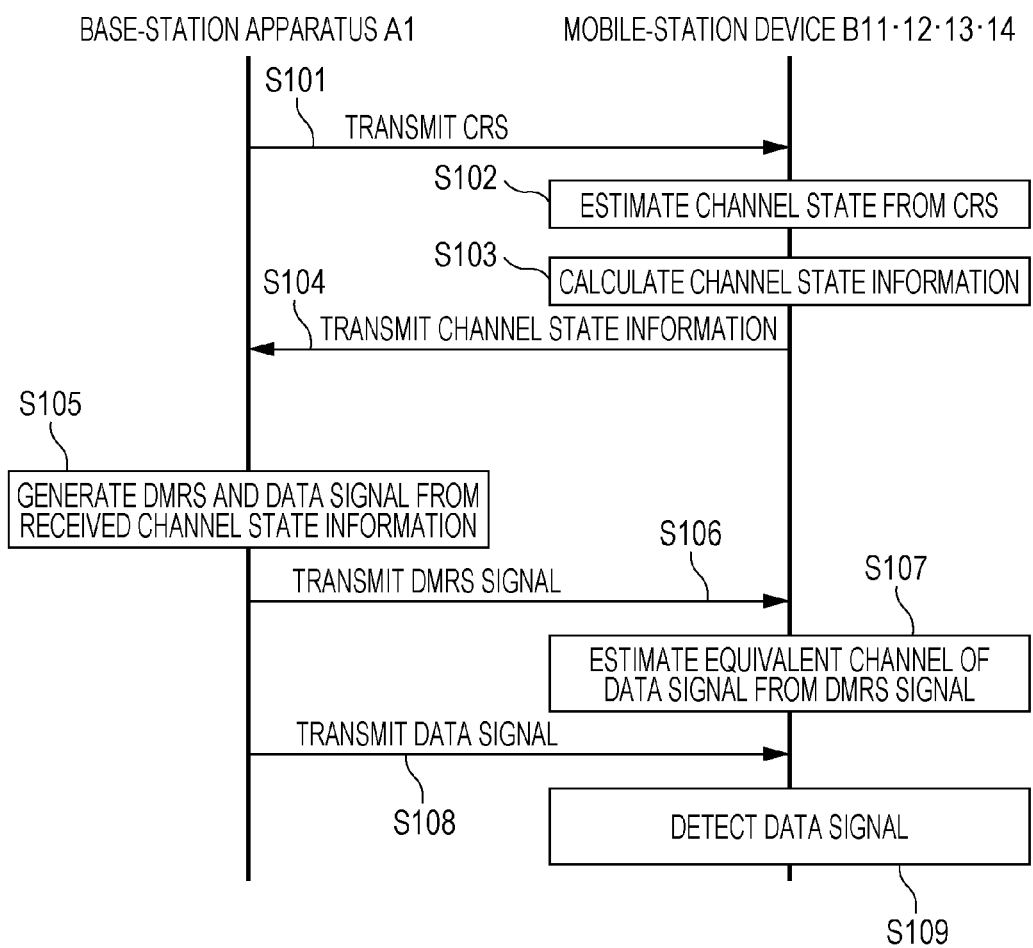
FIG. 2 illustrates a sequence chart illustrating an example of an operation of the communication system of the present embodiment.

FIG. 2 illustrates a sequence chart illustrating an example of an operation of the communication system of the present embodiment. FIG. 2 illustrates the example of the operation of the communication system 1 of FIG. 1.

(Step S101) The base-station apparatus A1 transmits the CRS to the first through fourth mobile-station devices B11 through B14. The base-station apparatus A1 then proceeds to step S102.

(Step S102) The first through fourth mobile-station devices B11 through B14 estimate the channel state in accordance with the CRS transmitted in step S101. Processing proceeds to step S103.

(Step S103) The first through fourth mobile-station devices B11 through B14 calculate the channel state information in accordance with the channel state estimated in step S102. Processing proceeds to step S104.

(Step S104) The first through fourth mobile-station devices B11 through B14 notify the base-station apparatus A1 of the channel state information calculated in step S103. Processing proceeds to step S105.

(Step S105) The base-station apparatus A1 calculates a filter to be used in the non-linear precoding operation in accordance with the channel state information transmitted in step S104. The base-station apparatus A1 performs the non-linear precoding operation on the generated DMRS and data signal using the filter, thereby generating DMRS and data signal. Processing proceeds to step S106.

(Step S106) The base-station apparatus A1 transmits the signal of DMRS generated in step S105 to the first through fourth mobile-station devices B11, B12, B13, and B14. Processing proceeds to step S107.

(Step S107) The first through fourth mobile-station devices B11 through B14 estimate the equivalent channel in accordance with the signal of DMRS transmitted in step S106. Processing proceeds to step S108.

(Step S108) The base-station apparatus A1 transmits the data signal generated in step S105 to each of the first through fourth mobile-station devices B11 through B14. Processing proceeds to step S109.

(Step S109) The first through fourth mobile-station devices B11 through B14 detect and acquire the data signal in accordance with the equivalent channel state information indicating the channel state of the equivalent channel estimated in step S108.

In FIGS. 1 and 2, the first through fourth mobile-station devices B11 through B14 are four-multiplexed. In the discussion that follows, N mobile-station devices, i.e., a first mobile-station device to an N-th mobile-station device B11 through B1N are multiplexed. The mobile-station devices B11 through BIN are collectively referred to as a mobile-station device B1$n$.

Base-Station Apparatus A1

Figure 3:
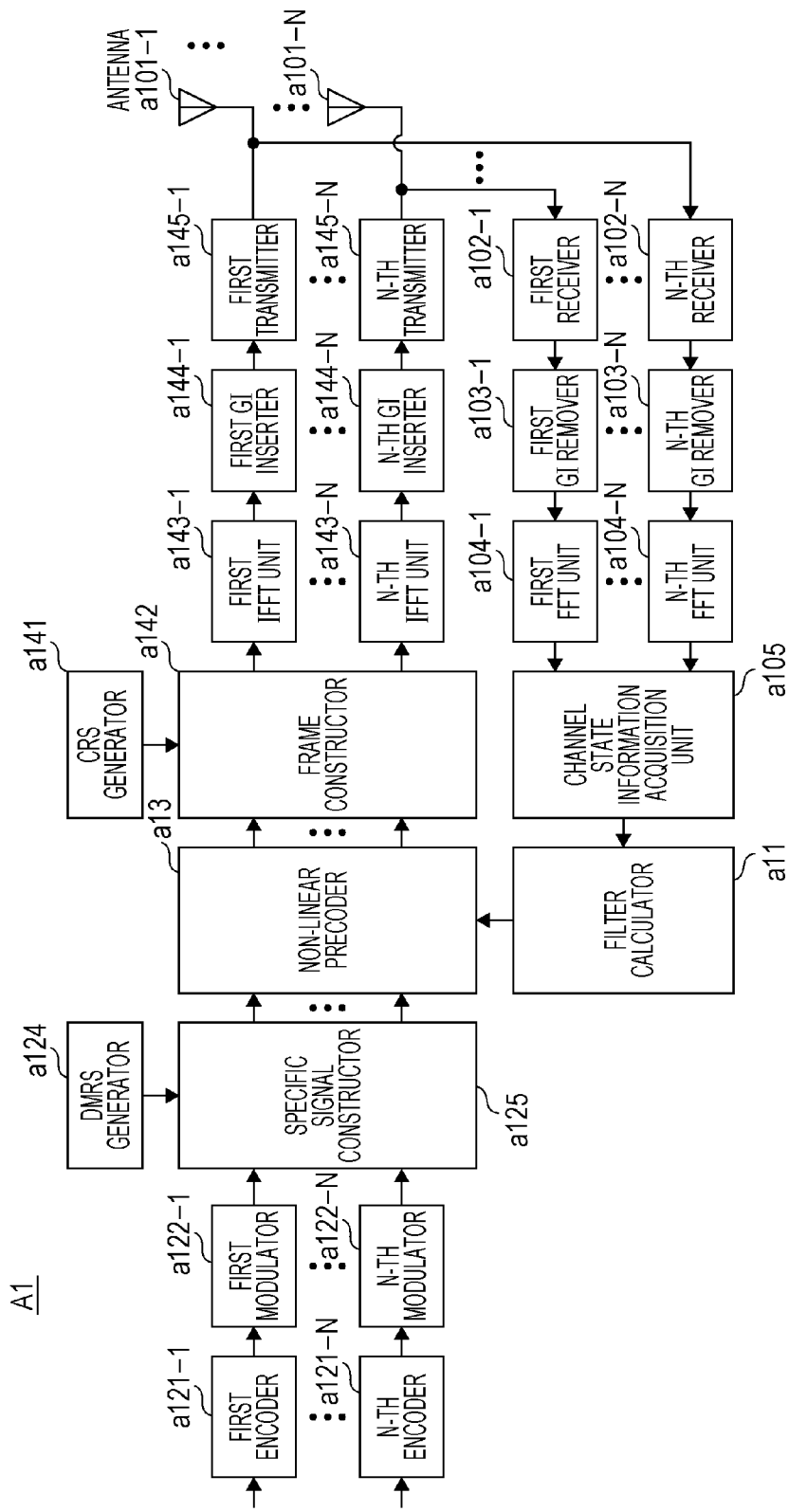
FIG. 3 is a function block diagram illustrating a general structure of a base-station apparatus of the present embodiment.

FIG. 3 is a function block diagram illustrating a general structure of the base-station apparatus A1 of the present embodiment. As illustrated in FIG. 3, the base-station apparatus A1 includes a first antenna a101-1 through an N-th antenna a101-N, a first receiver a102-1 through an N-th receiver a102-N, a first GI (Guard Interval) remover a103-1 through an N-th GI remover a103-N, a first FFT (Fast Fourier Transform) unit a104-1 through an N-th FFT unit a104-N, a channel state information acquisition unit a105, a filter calculator a11, a first encoder a121-1 through an N-th encoder a121-N, a first modulator a122-1 through an N-th modulator a122-N, a DMRS generator a124, a specific signal constructor a125, a non-linear precoder a13, a CRS generator a141, a frame constructor a142, a first IFFT (Inverse Fast Fourier Transform) unit a143 through an N-th IFFT unit a143-N, a first GI inserter a144-1 through an N-th GI inserter a144-N, and a first transmitter a145-1 through an N-th transmitter a145-N.

The base-station apparatus A1 of FIG. 3 includes N antennas of the first antenna a101-1 through N-th antenna a101-N, and serves as a base-station apparatus with N mobile-station devices multiplexed (N=4 in the example of FIGS. 1 and 2). In the discussion that follows, the base-station apparatus A1 of FIG. 3 uses orthogonal frequency division multiplexing (OFDM) scheme for uplink and downlink, for example. The present invention is not limited to this. The base-station apparatus A1 may use time division multiplexing (TDM) scheme or frequency division multiplexing (FDM) on one of the uplink and the down link or on both the uplink and the down link.

The first through N-th receivers a102-$n$ (n=1, 2, . . . , N) receive signals transmitted by each mobile-station device B1$n$ (a signal of a carrier frequency) via the first through N-th antennas a101-$n$. The signal includes the channel state information. The first through N-th receivers a102-$n$ down-convert the received signals, and A/D (analog/digital) convert the down-converted signals, thereby generating baseband digital signals. The first through N-th receivers a102-$n$ output the generated digital signals to the first through N-th GI removers a103-$n$.

The first through N-th GI removers a103-$n$ remove GI from the digital signals input from the first through N-th receivers a102-$n$, and then output the signals with GI removed therefrom to the first through N-th FFT units a104-$n$.

The first through N-th FFT units a104-$n$ perform FFT transform operations on the signals input from the first through N-th GI removers a103-$n$, thereby generating signals in the frequency domain. The first through N-th FFT units a104-$n$ output the generated signals in the frequency domain to the channel state information acquisition unit a105.

The channel state information acquisition unit a105 demodulates the signals input from the first through N-th FFT units a104-$n$, and extracts the channel state information from the demodulated information. The channel state information acquisition unit a105 outputs the extracted channel state information to the filter calculator a11. A signal, other than the signal of the channel state information, out of the signals output from the first through N-th FFT units a104-$n$, is demodulated by a controller (not illustrated). Control information of the demodulated information is used to control the base-station apparatus A1. Data other than the control information of demodulated signal is transmitted to another base-station apparatus, a server apparatus, and the like.

The filter calculator a11 calculates a filter for use in a non-linear precoding operation in accordance with the channel state information input from the channel state information acquisition unit a105. Details of a filter calculation process performed by the filter calculator a11 are described below. The filter calculator a11 inputs the calculated filter to the non-linear precoder a13.

The first through N-th encoders a121-$n$ receive information bit (data) addressed to each mobile-station device B1$n$ (N=4 in the example of FIGS. 1 and 2). The first through N-th encoders a121-$n$ error-correction encode the input information bit, and then output the encoded bits to the first through N-th modulators a122-$n$.

The first through N-th modulators a122-$n$ modulate the encoded bits input from the first through N-th encoders a121-$n$, thereby generating the data signal addressed to the mobile-station devices B1$n$. The first through N-th modulators a122-$n$ output the generated data signals to the specific signal constructor a125. The base-station apparatus A1 determines a modulation scheme for use in each of the first through N-th modulators a122-$n$ in accordance with the channel state information, and outputs modulation information indicating the determined modulation scheme to the first through N-th modulators a122-$n$. The base-station apparatus A1 notifies the first through N-th mobile-station devices B1$n$ of the modulation information.

The DMRS generator a124 generates DMRSs to be addressed to the first through N-th mobile-station devices B1$n$. The DMRS generator a124 outputs the generated DMRS to the specific signal constructor a125.

The specific signal constructor a125 associates the data signals addressed to the first through N-th mobile-station devices B1$n$ input from the first through N-th modulators a122-$n$ with the DMRSs addressed to the first through N-th mobile-station devices B1$n$ input from the DMRS generator a124. Pieces of information associated by the specific signal constructor a125 and addressed to the first through N-th mobile-station devices B1$n$ are referred to as specific signals of the first through N-th mobile-station devices B1$n$. The specific signal constructor a125 outputs to the non-linear precoder a13 the specific signals of the first through N-th mobile-station devices B1$n$ which are generated through the association operation thereof.

The non-linear precoder a13 performs a non-linear precoding operation on the specific signal (the data signal and the DMRS) of each of the first through N-th mobile-station devices Bin input from the specific signal constructor a125. The non-linear precoding operation to be performed by the non-linear precoder a13 is described in detail below. The non-linear precoder a13 outputs to the frame constructor a142 the specific signals that have been non-linearly precoded.

The CRS generator a141 generates the CRS including a known reference signal of the base-station apparatus A1 and the first through N-th mobile-station devices Bin, and then outputs the generated CRS to the frame constructor a142.

The frame constructor a142 maps the specific signal input from the non-linear precoder a13 and the CRS input from the CRS generator a141. The frame constructor a142 may map the specific signal and the CRS to the same frame or to different frames. For example, the frame constructor a142 may map only the CRS to a given frame, or may map the CRS and the specific signal to another frame. Note that the base-station apparatus A1 maps the CRS and the specific signal to a frame in accordance with a predetermined mapping and that the first through N-th mobile-station devices Bin have the knowledge of the mapping in advance.

The frame constructor a142 outputs, to the first through N-th IFFT units a143-$n$, a signal, out of the mapped signals, to be transmitted via the antenna a101-non a per frame unit basis.

The first through N-th IFFT units a143-$n$ perform an IFFT transform operation on the signal input from the frame constructor a142, thereby generating a signal in the time domain. The first through N-th IFFT units a143-$n$ output the generated signals in the time domain to the first through N-th GI inserters a144-$n$.

The first through N-th GI inserters a144-$n$ attach guard intervals to the signals input from the first through N-th IFFT units a143-$n$, and then output the signals with the guard intervals attached thereto to the first through N-th transmitters a145-$n$.

The first through N-th transmitters a145-$n$ D/A (digital/analog) convert the signals (baseband digital signals) input from the first through N-th GI inserters a144-$n$. The first through N-th transmitters a145-$n$ generate signals on a carrier frequency by up-converting the digital-to-analog converted signal. The first through N-th transmitters a145-$n$ transmit the generated signals via the first through N-th antennas a101-$n$.

Figure 4:
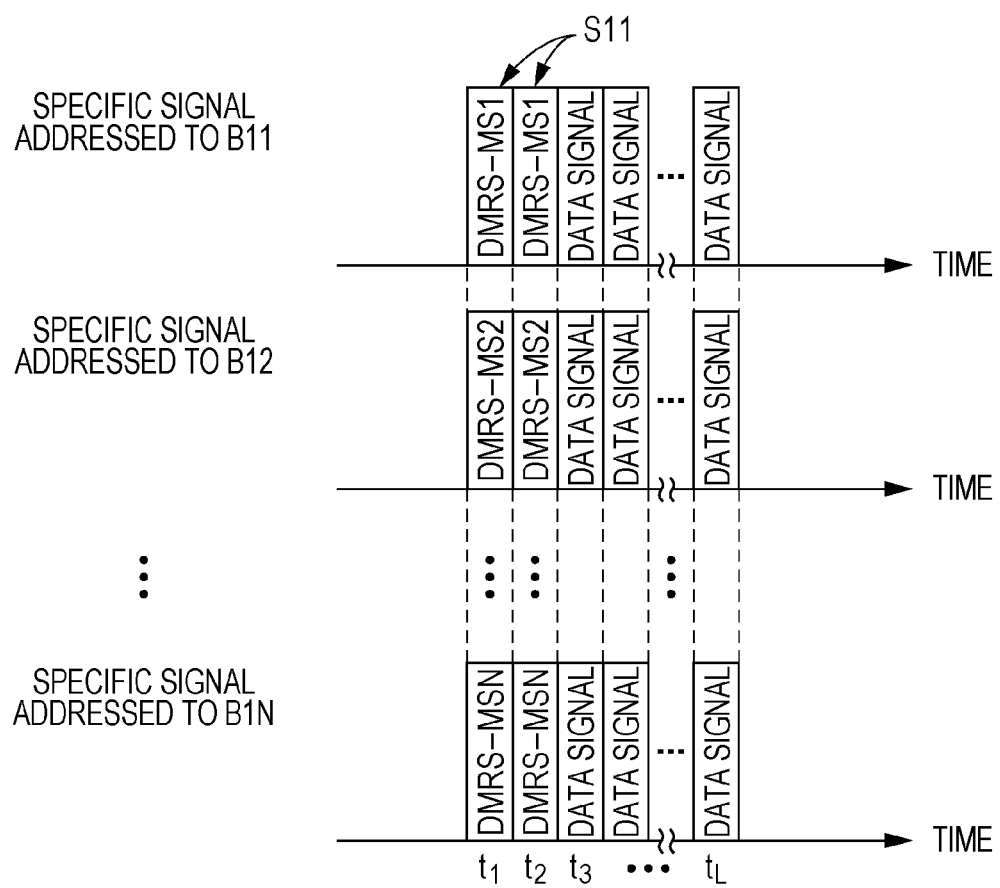
FIG. 4 is a schematic diagram illustrating a structure example of a specific signal of the present embodiment.

FIG. 4 is a schematic diagram illustrating a structure example of the specific signal of the present embodiment. In FIG. 4, the abscissa represents time. FIG. 4 illustrates the specific signal output by the specific signal constructor a125. FIG. 4 also illustrates the specific signals of the first through N-th mobile-station devices Bin to be transmitted on the same frequency aligned on the time axis.

In FIG. 4, the DMRSs addressed to the first through N-th mobile-station devices Bin are referred to as "DMRS-MSn". As illustrated in FIG. 4, the specific signal is for each of the first through N-th mobile-station devices Bin and includes the DMRS and the data signal. For example, a signal labeled symbol S11 indicates the DMRS addressed to the mobile-station device B11 (DMRS-MS1).

FIG. 4 indicates that the DMRSs addressed to the first through N-th mobile-station devices Bin are output at the same time from the specific signal constructor a125. FIG. 4 also indicates that the data signals addressed to the first through N-th mobile-station devices Bin are also output from the specific signal constructor a125 at the same time. As described above, the data signals assigned to the same time and the DMRSs assigned to the same time are spatial multiplexed by the non-linear precoder a13 and then transmitted from the base-station apparatus A1 at the same timing and on the same frequency (i.e., by the same subcarrier of the same OFDM symbol). FIG. 4 also indicates that the DMRS and the data signal are output from the specific signal constructor a125 at different timings. For example, the DMRSs addressed to the first through N-th mobile-station devices B1$n$ are output at time $t_1$ and time $t_2$, and the data signals addressed to the first through N-th mobile-station devices B1$n$ are output at time $t_3$ through time $t_L$.

Note that the structure of the specific signal of FIG. 4 is an example only, and the present invention is not limited to this structure. For example, as illustrated in FIG. 4, the data signal is output (at $t_3$ thereafter) after the DMRS addressed to the mobile-station device B1$n$ is output. Alternatively, the specific signal constructor a125 may output the DMRS after outputting the data signal. Also, the specific signal constructor a125 may output the data signal and the DMRS alternately on the time axis, or in another sequential order.

Figure 5A:
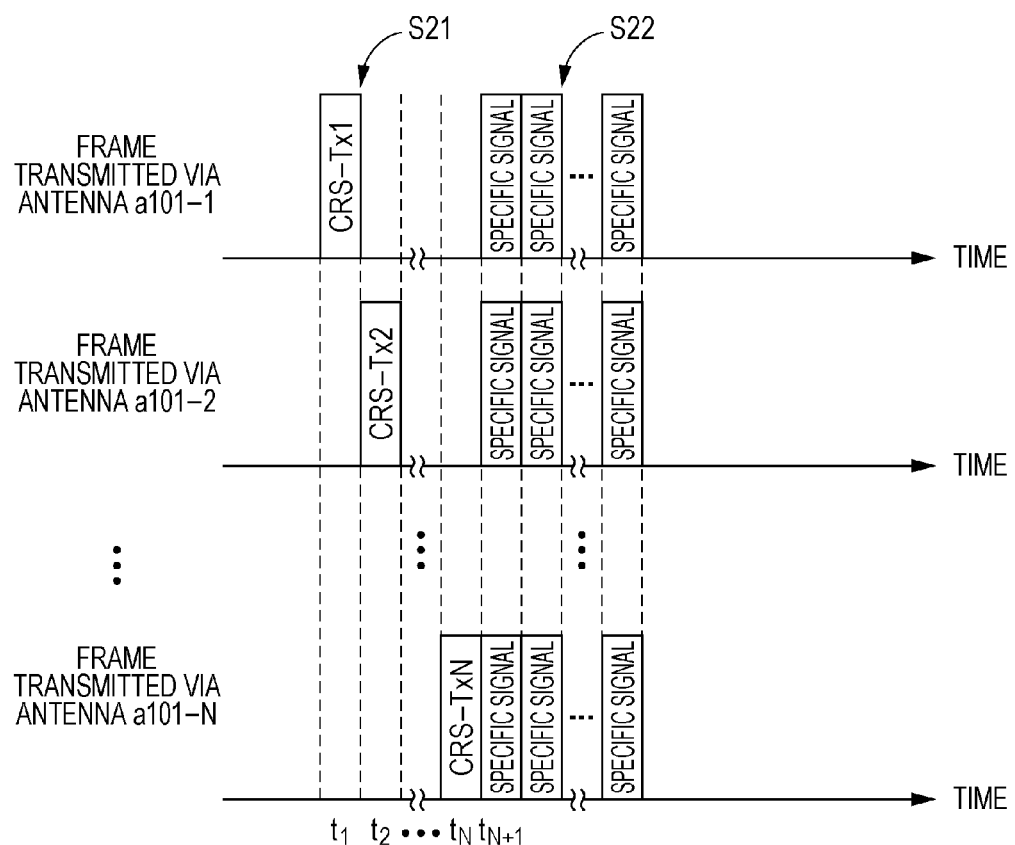
FIG. 5A is a schematic diagram illustrating a structure example of frames of the present embodiment.

FIG. 5A is a schematic diagram illustrating a structure example of frames of the present embodiment. FIG. 5A illustrates the structure of frames to which the frame constructor a142 maps the signal. Also, FIG. 5A illustrates the structures of the frames aligned along the time axis and transmitted via the first through N-th antennas a101-$n$.

In FIG. 5A, the CRSs transmitted via the first through N-th antennas a101-$n$ are labeled "CRS-Txn". FIG. 5A also illustrates that each of the frames of the first through N-th antennas a101-$n$ includes a CRS and a specific signal (the non-linearly precoded specific signal including the data signal and the DMRS). For example, a signal labeled symbol S21 indicates a CRS (CRS-Tx1) to be transmitted via the antenna a101-1. A signal labeled symbol S22 is a non-linearly precoded specific signal to be transmitted via the antenna a101-1.

FIG. 5A illustrates the CRSs that arranged at different time bands by the frame constructor a142 and are transmitted via the antenna a101-$n$ from the base-station apparatus A1. For example, the CRS to be transmitted via the antenna a101-1 is transmitted at time t1, and the CRS to be transmitted via the antenna a101-2 is transmitted at time $t_2$.

FIG. 5A also illustrates the CRS and the specific signal that are arranged at different time bands by the frame constructor a142. For example, the CRSs to be transmitted via the antenna a101-$n$ are arranged in a time band for transmission of time $t_1$ through time $t_N$, and the specific signals are arranged in a time band at time $t_{N+1}$ thereafter. As also illustrated in FIG. 5A, the specific signals to be transmitted via the first through N-th antennas a101-$n$ are arranged in the same time band by the frame constructor a142.

FIG. 5A illustrates the frame structure for exemplary purposes only, and the present invention is not limited to this frame structure. For example, as illustrated in FIG. 5A, all CRSs to be transmitted via the antennas a101-$n$ are arranged in a preceding time band (earlier than $t_{N+1}$), and the specific signals are arranged in a subsequent time band (at $t_{N+1}$ thereafter). Alternatively, the frame constructor a142 may arrange the specific signals in the preceding time band, and the CRSs in the subsequent time band. Alternatively, the frame constructor a142 may arrange the specific signal and the CRS alternately in time bands, or in another sequential order. For example, the frame constructor a142 may arrange the CRS to be transmitted via the antenna a101-1 in the time band subsequent to time $t_{N+1}$ and the specific signal in the time band prior to time $t_{N+1}$. Note that the base-station apparatus A1 transmits a frame having only the CRS arranged therewithin before starting the transmission of the specific signal.

Figure 5B:
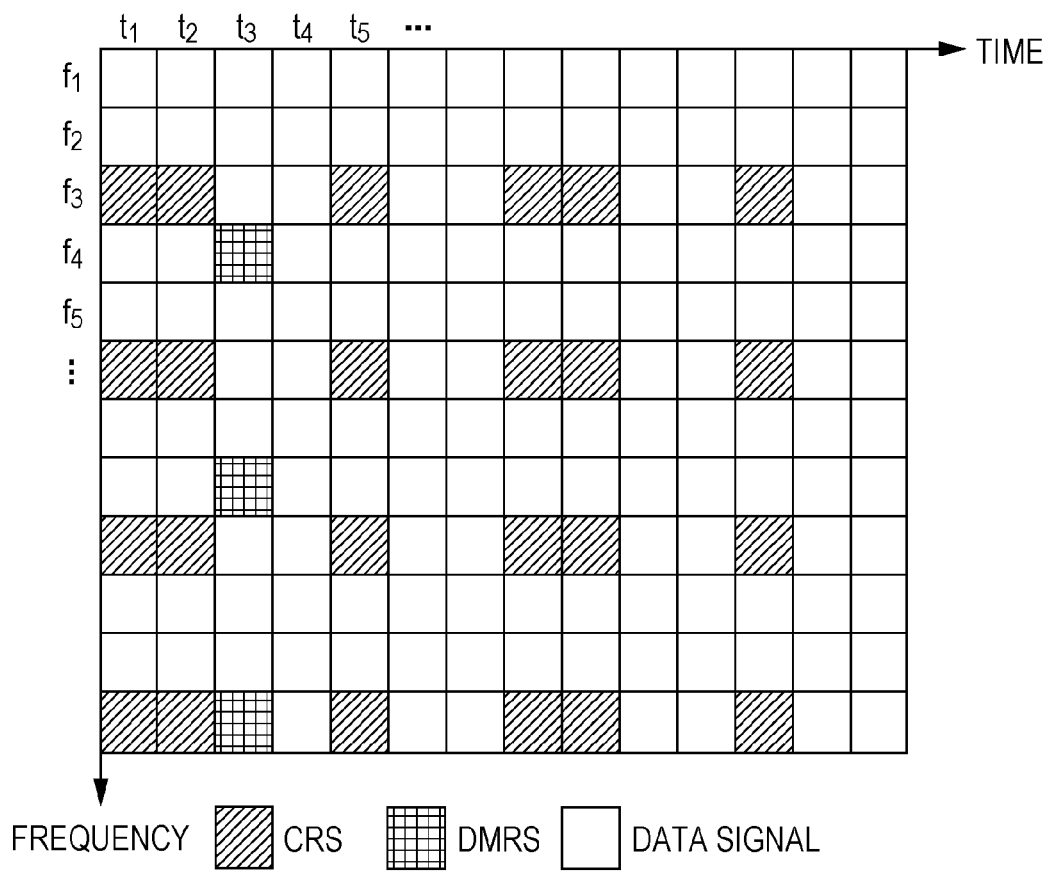
FIG. 5B illustrates a first structure example of frames transmitted via first through N-th antennas a101-$n$.
Figure 5C:
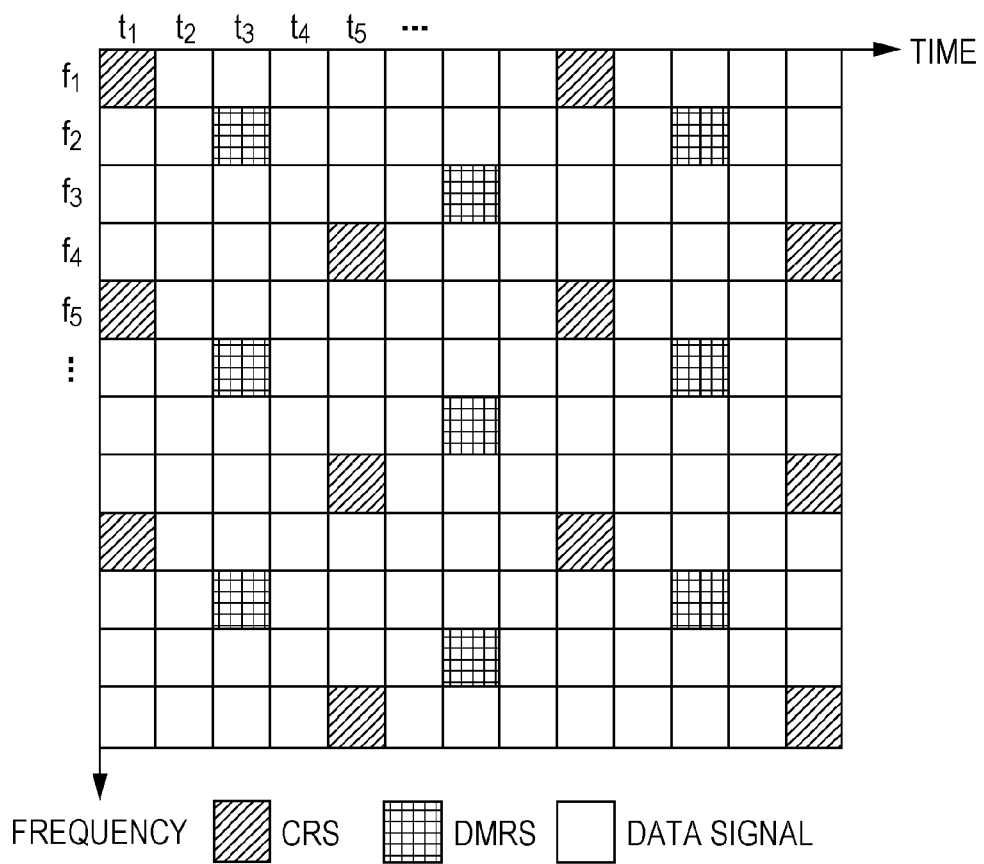
FIG. 5C illustrates a second structure example of frames transmitted via the first through N-th antennas a101-$n$.

FIG. 5B and FIG. 5C illustrate a structure example of the frames to be transmitted via the first through N-th antennas a101-$n$. FIG. 4 and FIG. 5A illustrate the DMRS and data signal, or the CRS and specific signal (including the DMRS and data signal) arranged in the time direction. As illustrated in FIG. 5B and FIG. 5C, the CRS, DMRS, and data signal may be arranged in a two-dimensional matrix along the time direction (t) and frequency direction (f).

Mobile-Station Device B1n

Figure 6:
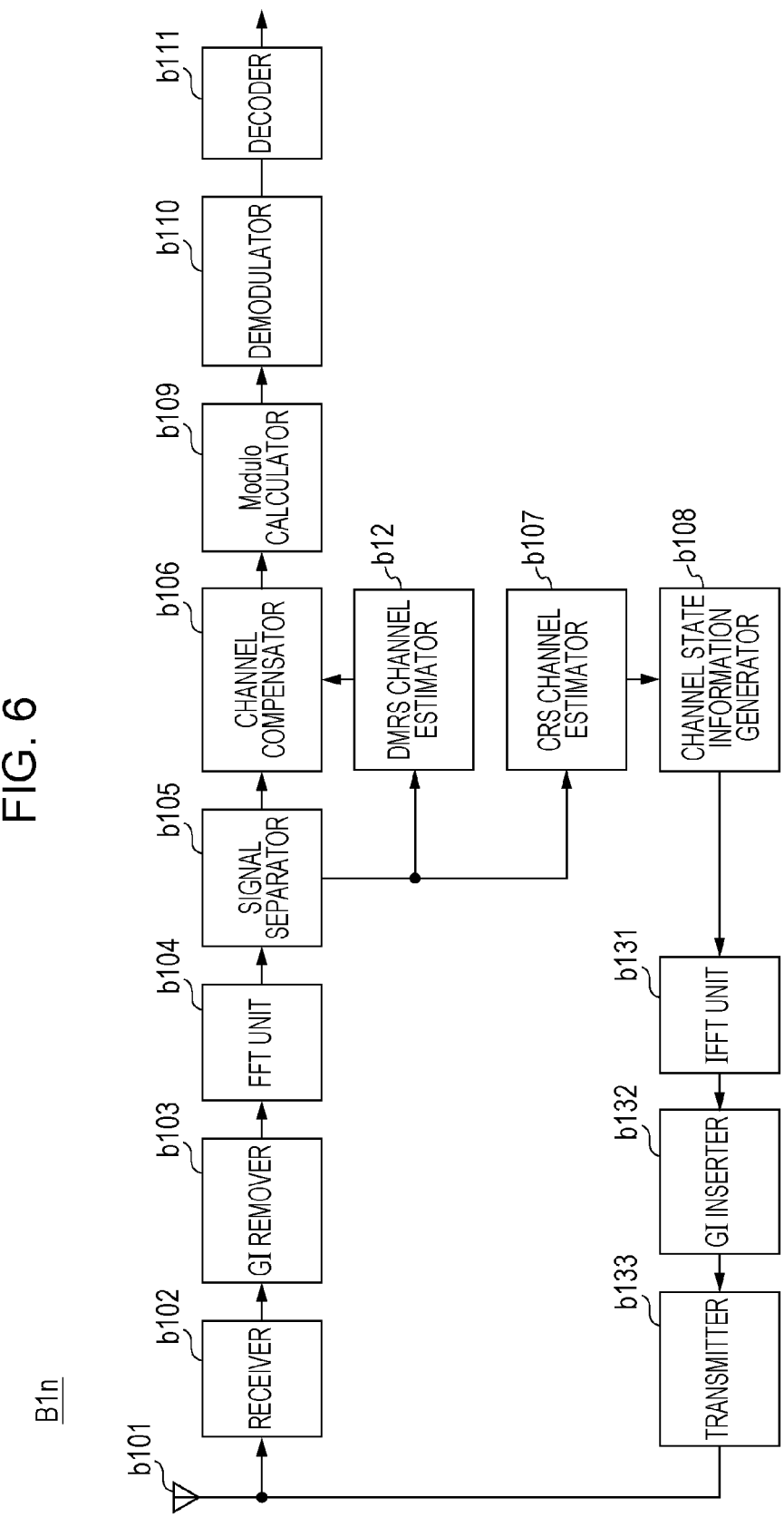
FIG. 6 is a function block diagram illustrating a structure example of a mobile-station device of the present embodiment.

FIG. 6 is a function block diagram illustrating a structure example of the mobile-station device B1n of the present embodiment. As illustrated in FIG. 6, the mobile-station device B1n includes an antenna b101, a receiver b102, a GI remover b103, an FFT unit b104, a signal separator b105, a CRS channel estimator b107, a DMRS channel estimator b12, a channel compensator b106, a modulo calculator b109, a demodulator b110, a decoder b111, a channel state information generator b108, an IFFT unit b131, a GI inserter b132, and a transmitter b133.

The receiver b102 receives a signal transmitted by each mobile-station device B1n (a signal on a carrier frequency) via the antenna b101. The receiver b102 down-converts and A/D (analog/digital) converts the received signal, thereby generating a baseband digital signal. The receiver b102 outputs the generated digital signal to the GI remover b103.

The GI remover b103 removes the GI from the digital signal input from the receiver b102, and outputs the signal without the GI to the FFT unit b104.

The FFT unit b104 performs a fast Fourier transform operation on the signal input from the GI remover b103, thereby generating a signal in the frequency domain. The FFT unit b104 outputs the generated signal in the frequency domain to the signal separator b105.

The signal separator b105 demaps the signal input from the FFT unit b104 in accordance with mapping information from the base-station apparatus A1. The signal separator b105 outputs out of the demapped signal, a CRS to the CRS channel estimator b107 and a DMRS to the DMRS channel estimator b12. The signal separator b105 outputs a data signal to the channel compensator b106. Furthermore, the signal separator b105 inputs the data signal to the DMRS channel estimator b12.

The CRS channel estimator b107 estimates a channel state in accordance with the CRS input from the signal separator b105, and then outputs information indicating the estimated channel state to the channel state information generator b108.

In accordance with the DMRS input from the signal separator b105, the DMRS channel estimator b12 estimates a channel state of an equivalent channel that includes as part thereof a filter to be used in the non-linear precoding operation. The DMRS channel estimator b12 is described in detail below. The DMRS channel estimator b12 outputs equivalent channel state information indicating the channel state of the estimated equivalent channel to the channel compensator b106. The channel compensator b106 performs channel compensation on the signal input from the signal separator b105 using the equivalent channel state information input from the DMRS channel estimator b12. The channel compensator b106 outputs the channel compensated signal to the modulo calculator b109.

The modulo calculator b109 performs a modulo operation on the signal input from the channel compensator b106 in accordance with modulation information from the base-station apparatus A1. The modulo operation is expressed by the following Expression.

$$\mathrm{mod}(\alpha) = \alpha - \mathrm{floor}((\mathrm{Re}[\alpha] + \tau/2)/\tau) \cdot \tau - i \times \mathrm{floor}((\mathrm{Im}[\alpha] + \tau/2)/\tau)\tau \quad (1\text{-}1)$$

Expression (1-1) indicates the modulo operation that is performed on a signal α with a modulo width τ. Also, floor(x) represents a maximum integer that does not exceed x, and Re[α] and Im[α] respectively represent a real part and an imaginary part of a complex number α. Here, i represents a unit of complex number. Also, τ represents the modulo width. If the modulation scheme of the data signal is QPSK, τ is preferably $2 \times 2^{1/2}$ times the mean amplitude of QPSK signal, if the modulation scheme of the data signal is 16QAM, τ is preferably $8 \times 10^{1/2}$ times the 16QAM signal, and if the modulation scheme of the data signal is 64QAM, τ is preferably $16 \times 42^{1/2}$ times the 64QAM signal. The modulo width may be different if the base-station apparatus and the mobile-station device use a common value.

The modulo calculator b109 outputs a value as a modulo operation result to the demodulator b110.

The demodulator b110 demodulates the signal input from the modulo calculator b109 in accordance with a modulation scheme indicated by the modulation information from the base-station apparatus A1. The demodulator b110 outputs to the decoder b111 the demodulated information (hard-determined encoded bit or soft-estimated value of the encoded bit).

The decoder b111 acquires an information bit by decoding the information input from the demodulator b110, and then outputs the acquired information bit.

The channel state information generator b108 generates the channel state information from the channel state input from the CRS channel estimator b107 (this operation is referred to as a channel state information generation process). The estimated channel state is herein referred to as a row vector $h_n = [h_{n1}, h_{n2}, \ldots, h_{nN}]$. Let $h_{n1}, h_{n2}, \ldots, h_{nN}$ represent a channel state between the antenna a101-1 and the mobile-station device B1n, a channel state between the antenna a101-2 and the mobile-station device B1n, ..., and a channel state between the antenna a101-N and the mobile-station device B1n. The channel state information generator b108 does not necessarily have to notify the base-station apparatus A1 of the row vector $|h_n|$ exactly as the channel state information. For example, the channel state information generator b108 may normalize the row vector by norm $|h_n|$ of the row vector of in accordance with a predetermined number C, and notifies the base-station apparatus A1 of the resulting normalized row vector $C \times h_n / |h_n|$. Alternatively, the channel state information generator b108 may notify the base-station apparatus A1 of a value approximated to be a predetermined value as the channel state information.

The channel state information generator b108 modulates the generated channel state information, and outputs the modulated signal of the channel state information to the IFFT unit b131.

The IFFT unit b131 performs an inverse Fourier transform operation on the signal input from the channel state information generator b108, thereby generating a signal in the time domain. The IFFT unit b131 outputs the generated signal in the time domain to the GI inserter b132.

The GI inserter b132 attaches the guard interval to the signal input from the IFFT unit b131, and outputs the signal with the guard interval attached thereto to the transmitter b133.

The transmitter b133 D/A (digital/analog) converts the signal (a baseband digital signal) input from the GI inserter b132. The transmitter b133 up-converts the converted signal, thereby generating a signal on a carrier frequency. The transmitter b133 transmits the generated signal via the antenna b101.

Filter Calculator a11

The filter calculator a11 of FIG. 3 constructs a channel matrix H from the channel state information input from the channel state information acquisition unit a105. H represents is a matrix of N rows and N columns, and a component at a p-th row and a q-th column represents a complex gain of a channel between a p-th mobile-station device B1p and a q-th antenna a101-$q$ of the base-station apparatus (each of p and q is an integer from 1 to N). More specifically, the channel state acquired from the channel state information from each mobile-station device B1$p$ becomes a row vector, and the channel matrix H is generated by arranging a matrix having row vectors corresponding to all the mobile-station devices. If the norm of the channel state information is normalized by the mobile-station device B1$n$, the base-station apparatus A1 generates the channel matrix H using the channel state information from the mobile-station device B1$n$, that is, using a normalized channel state at each row.

The filter calculator a11 calculates an inverse matrix W ($=H^{-1}$) of the channel matrix H, and inputs the inverse matrix to the non-linear precoder a13.

Detail of Non-Linear Precoder A13

Let sn represent each specific signal input from the specific signal constructor a125, and s represent a column vector having each components of all s1 through Sn. The specific signal herein refers to the data signal and the DMRS generated by the DMRS generator a124. As for the DMRS signal herein, the value of $\tau$ is determined independently of the data signal, but it is necessary to use a DMRS signal having a value common to the base-station apparatus and the mobile-station device. For example, the DMRS signal may match one point of the QPSK signal, and $\tau = 2 \times 2^{1/2}$ is used even if the data signal is modulated through 16QAM. The non-linear precoder a13 searches for a combination of N-dimensional integer column vectors Z1 and Z2 that minimizes the norm of a transmit signal multiplied by filter W. This operation may be expressed by the following expression.

$$(Z1,Z2) = \text{argmin}_{(z1,z2)} |W(s+z1\tau+iz2\tau)| \tag{1-2}$$

A combination (z1, z2) that minimizes the norm $|W(s+z1\tau+iz2\tau)|$ on the right side is represented by (Z1, Z2). Since each component of z1 and z2 can take any integer, it is difficult to search for all the combinations. A search range of each component of z1 and z2 is thus limited to a predetermined range (for example, to an integer having the absolute value $L_{BS}$ or less: $[-L_{BS}, -L_{BS}+1, \ldots, -2, -1, 0, 1, 2, \ldots, L_{BS}-1, L_{BS}]$). A search operation is preferably performed on points as candidates centered on a signal point Ws, but a method other than this method may be used to search for a point that minimizes the norm. Here, z1$\tau$+z2$\tau$ is referred to as a perturbation vector. A signal x=W(s+Z1$\tau$+iZ2$\tau$) based on the calculated (Z1, Z2) is power-normalized.

The base-station apparatus A1 needs to normalize total transmit power of data signals within a constant number of subcarriers and a constant number of OFDM symbols (referred to as a "power normalization unit") in order to keep the transmit power constant. The power normalization unit represents the entire frame unit of FIG. 5B and FIG. 5C. Total power $P_x$ across the power normalization unit of the power of the data signals x calculated in the non-linear precoding operation is calculated. Let $P_{tr}$ represent the total power assigned to the base-station apparatus A1 to transmit the data signal of one power normalization unit, and a power normalization coefficient g ($=(P_x/P_{tr})^{1/2}$) is calculated. The non-linear precoder a13 multiplies the specific signal x (the data signal and DMRS) by the reciprocal of the power normalization coefficient g, and inputs the data signal subsequent to the multiplication to the frame constructor a142. Each component of the signal x indicates a transmit signal to be transmitted by each of the first antenna a101-1 through N-th antenna a101-1.

Since the DMRS signal itself is multiplied by $g^{-1}$ in the mobile-station device B1$n$, the DMRS channel estimator b12 may estimate the channel, and the channel compensator b106 may perform the compensation operation on the amplitude of the data signal by multiplying the amplitude by g. More specifically, a signal can correctly be detected by multiplying the received data signal by g.

As described above, the non-linear precoder a13 of the present invention performs on the DMRS the same non-linear precoding operation as the non-linear precoding operation performed on the data signal, including the power normalization.

Detail of DMRS Channel Estimator b12

Since the base-station apparatus B1 multiplies the data signal by W ($=H^{1}$), the received signal is HWs=s in an ideal environment, and no channel compensation is needed on the data signal. However, since (1) the base-station apparatus A1 has performed the power normalization, and (2) the channel state changes from when the mobile-station device B1$n$ feeds back the channel state information to when the base-station apparatus A1 transmits the data signal, a reception gain of the data signal (a complex gain of an equivalent channel including the precoding) needs to be freshly estimated during a data signal reception using the DMRS that has undergone the same precoding operation as the precoding operation performed on the data signal.

Figure 7:
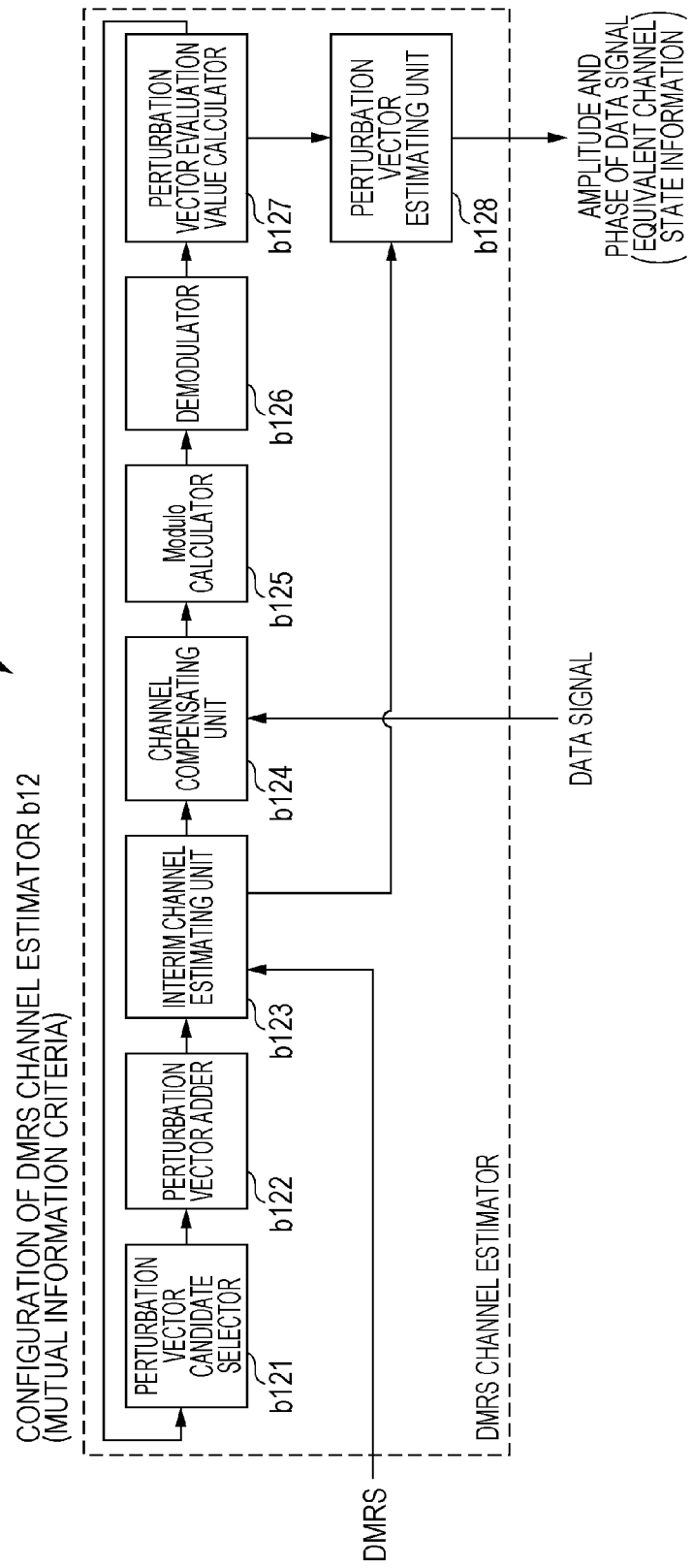
FIG. 7 is a function block diagram illustrating a DMRS channel estimator in detail.

FIG. 7 illustrates the DMRS channel estimator b12 in detail. The DMRS channel estimator b12 includes a perturbation vector candidate selector b121, a perturbation vector adder b122, an interim channel estimating unit b123, a channel compensating unit b124, a modulo calculator b125, a demodulator b126, a perturbation vector evaluation value calculator b127, and a perturbation vector estimating unit b128.

(Step S21) The perturbation vector candidate selector b121 selects a perturbation vector candidate, and input the selected perturbation vector to the perturbation vector adder b122. A perturbation vector Za serving as a candidate is expressed by $$Za = (z1a+iz2a)\tau \tag{1-3}$$

where z1a and z2a are N-dimensional column vectors, and each component falls within a predetermined range (for example, an integer having the absolute value $L_{MS}$ or less: $[-L_{MS}, -L_{MS}+1, \ldots, -2, -1, 0, 1, 2, \ldots, L_{MS}-1, L_{MS}]$). The number of candidates of the perturbation vectors present and expressed in Expression (1-3) is $(2L_{MS}+1)^{2N}$. Here, the base-station apparatus A1 and the mobile-station device B1$n$ use a common DMRS modulo width.

In Expression (1-3), the candidates of the perturbation vector are also restricted in the base-station apparatus as well. Although condition $L_{BS}=L_{MS}$ holds preferably, condition $L_{BS}>L_{MS}$ may be acceptable to reduce an amount of calculation in the mobile-station device B1$n$.

In THP or LR-THP to be described with reference to a third embodiment, it is difficult to determine $L_{BS}$, and $L_{MS}$ may be determined depending on the amount of calculation of the mobile-station device B1$n$.

(Step S22) Next, the perturbation vector adder b122 calculates a signal q+Za by adding a perturbation vector candidate Za=(Z1a+iZ2a)$\tau$ to a reference signal q (a signal transmitted from the base-station apparatus and being a DMRS signal prior to the non-linear precoding operation). The perturbation vector adder b122 inputs the signal q+Za to the interim channel estimating unit b123.

(Step S23) Next, the interim channel estimating unit b123 divides the received DMRSp by the signal q+Za. The complex gain may be estimated to be h=p/(q+Za).

The interim channel estimating unit b123 inputs an amplitude |h| and a phase arg (h) of the complex gain h to the channel compensating unit b124 and the perturbation vector estimating unit b128.

(Step S24) The channel compensating unit b124 performs the channel compensation on the data signal in the frame having the DMRS therewithin using the amplitude and phase input from the interim channel estimating unit b123. More specifically, the channel compensating unit b124 divides the received signal by the complex gain h. The channel compensating unit b124 inputs the channel-compensated data signal to the modulo calculator b125.

(Step S25) The modulo calculator b125 performs a modulo operation on the data signal channel-compensated by the channel compensating unit b124. The modulo calculator b125 uses the data signal modulo width common to the base-station apparatus A1 and the mobile-station device B1n. The modulo calculator b125 inputs the modulo calculated data signal to the demodulator b126.

(Step S26) The demodulator b126 soft-estimates the input modulo operated data signal, and then inputs the soft-estimated value to the perturbation vector evaluation value calculator b127.

Note that the demodulator b126 calculates a soft-estimated value as a log likelihood ratio (LLR). LLR is calculated using the following Expression.

[Math 1]

$$L_m = \log \frac{\sum_{s_k \subset S_m^+} p[y|s_k]}{\sum_{s_k \subset S_m^-} p[y|\dot{s}_k]} \quad (1\text{-}4)$$

[Math 2]
[Math 2]

$$p[y|s_k] = \frac{1}{\sqrt{\pi \sigma_n^2}} \exp\left(-\frac{|y-s_k|^2}{\sigma_n^2}\right) \quad (1\text{-}5)$$

Here, y represents the modulo-operated data signal input from the modulo calculator b125, and $s_k$ represents each of the signal points of each modulation scheme. Also, $s_m^+$ represents a signal point with a m-th bit thereof modulated through each modulation scheme and being +1, and $s_m^-$ represents a signal point with a m-th bit thereof modulated through each modulation scheme and being 0. Also, $\sigma_n^2$ represents a sum of variances of noises in I-ch and Q-ch of each modulation signal (i.e., complex Gaussian noise power).

In accordance with Expression (1-4) and Expression (1-5), the demodulator b126 inputs, to the perturbation vector evaluation value calculator b127, LLR corresponding to each bit assigned to each data signal. More specifically, the demodulator b126 calculates LLRs of the number equal to the number of data signals×2 in the case of QPSK, and calculates LLRs of the number equal to the number of data signals×4 in the case of 16QAM, and then inputs the resulting LLRs to the perturbation vector evaluation value calculator b127.

(Step S27) The perturbation vector evaluation value calculator b127 calculates a variance of the input LLRs, and input the calculated variance of the LLRs to the perturbation vector estimating unit b128. The variance of LLRs is calculated in accordance with the following Expression.

[Math 3]

$$\sigma_{LLR}^2 = \frac{1}{VM} \sum_{v=1}^{V} \sum_{m=1}^{M} L_m^{v2} \quad (1\text{-}6)$$

Here V represents the number of data signals soft estimated on each candidate of the perturbation vectors. M represents a bit count assigned to each modulation scheme, and is 2 in QPSK, and 4 in 16 QAM. $L_m^v$ represents LLR at the m-th bit assigned to a v-th data signal.

(Step S28) The perturbation vector estimating unit b128 selects the largest variance of the variances of LLRs corresponding to perturbation vectors input from the perturbation vector evaluation value calculator b127, outputs the amplitude and phase of the data signal (referred to as "equivalent channel state information") corresponding to the perturbation vector having the largest variance, and thus inputs the equivalent channel state information to the channel compensator b106 in the DMRS channel estimator b12 (FIG. 6).

A large variance of LLRs indicates that a mutual amount of information transmitted from the base-station apparatus A1 is the largest when each perturbation vector is assumed. The absolute value of LLR becomes larger as the "probability" that each bit is 1 or 0 is higher. Each perturbation vector is assumed, and the variance of LLRs is calculated. The perturbation vector having the highest "probability" is estimated by selecting a perturbation vector having the largest variance of the LLRs.

Since the channel compensating unit b124, the modulo calculator b125, and the demodulator b126 in the DMRS channel estimator b12 perform the same operations as those of the channel compensator b106, the modulo calculator b109, and the demodulator b110 respectively external to the DMRS channel estimator b12, the same circuit design may be shared to reduce the circuit scale. A soft-estimated value corresponding to the perturbation vector estimated by the perturbation vector estimating unit b128, out of the soft-estimated values calculated by the demodulator b126, may be used by the decoder b111. This arrangement avoids calculating the soft-estimated value twice, leading to a reduction in the amount of calculation.

Advantageous Effects

As described with reference to the present embodiment, the base-station apparatus spatial multiplexes the DMRSs through NLP MU-MIMO and transmits the multiplexed DMRSs. Power efficiency is thus increased, and the overhead involved in the insertion of the DMRS is reduced.

Note that the data signal that is soft-estimated to estimate the perturbation vector may be a data signal as part of a frame. The perturbation vector may be estimated using an index other than the variance of the LLRs.

Second Embodiment

Two-Dimensional Euclidean Algorithm

In the first embodiment, the mobile-station device B1n estimates the likeliest perturbation vector from the candidates of the perturbation vectors. In this way, the DMRSs can be spatial multiplexed using NLP MU-MIMO. In a second embodiment, two apparatuses including a base-station apparatus A2 and a mobile-station device B2n perform a process referred to as "two-dimensional Euclidean algorithm", and the mobile-station device B2n operates with an amount of calculation lower than the amount of calculation of the mobile-station device B2n in a first embodiment.

Figure 15:
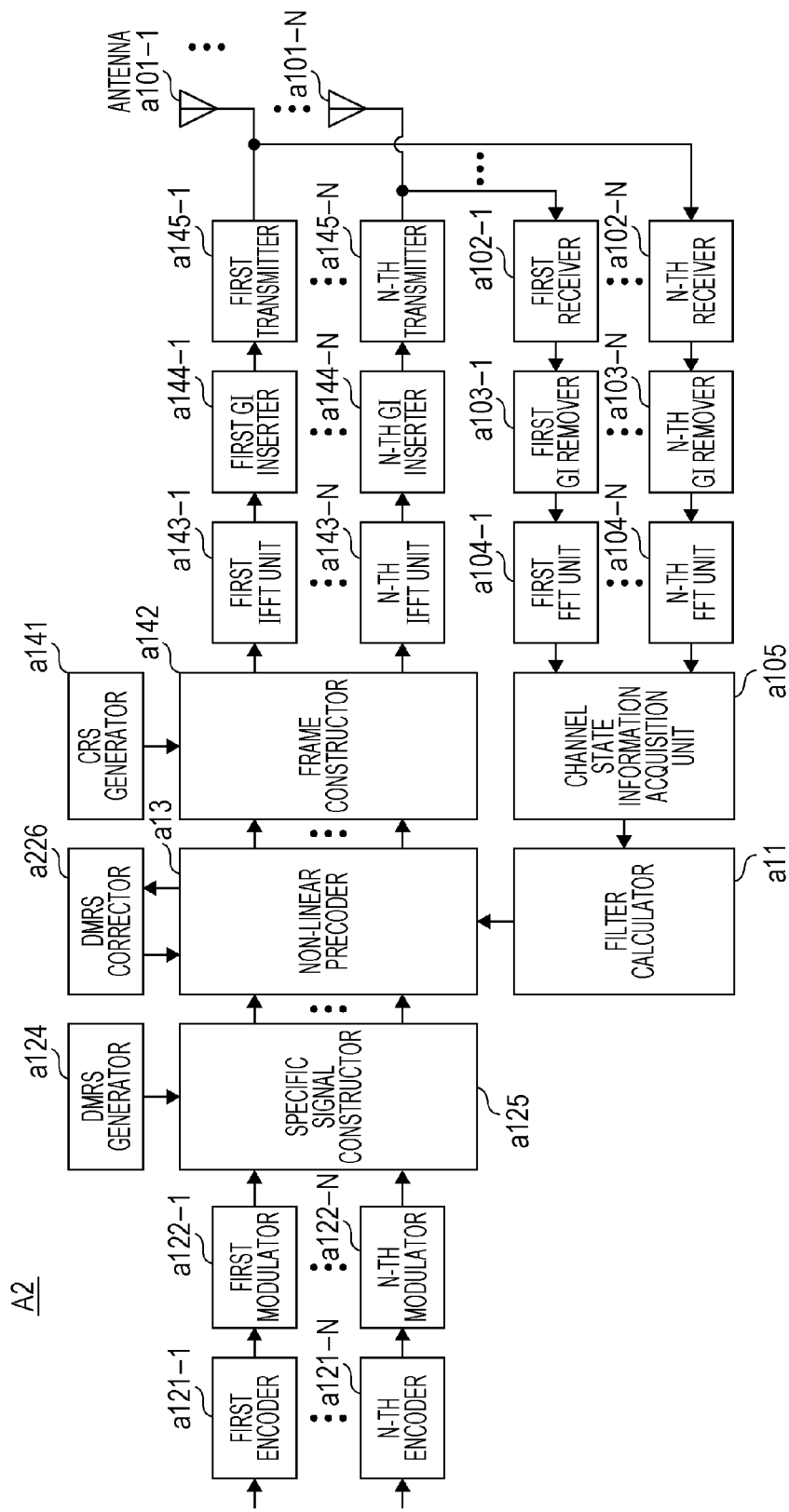
FIG. 15 is a function block diagram illustrating a configuration example of a base-station apparatus of a second embodiment of the present invention.

The base-station apparatus A2 of the present embodiment is identical to the base-station apparatus A1 of the first embodiment except that the base-station apparatus A2 includes a DMRS corrector a226. The mobile-station device B2n of the present embodiment is identical to the mobile-station device B1n of the first embodiment except that a DMRS channel estimator b22 in the mobile-station device B2n is different in operation from the DMRS channel estimator b12. The following discussion focuses on the difference between the first embodiment and the second embodiment. FIG. 15 illustrates a configuration of the base-station apparatus A2. As described above, the DMRS corrector a226 is newly added to the configuration of FIG. 3.

The DMRS corrector a226 in the base-station apparatus A2 and the DMRS channel estimator b22 in the mobile-station device B2n are described in detail.

Two-Dimensional Euclidean Algorithm

Each of the base-station apparatus A2 and mobile-station device B2n of the present embodiment includes a two-dimensional Euclidean algorithm unit that performs a "two-dimensional Euclidean algorithm process". The two-dimensional Euclidean algorithm unit constitutes one of the features of the present embodiment, and the principle thereof is described first.

The two-dimensional Euclidean algorithm is an algorithm to which a standard Euclidean algorithm is extended. The standard Euclidean algorithm is herein referred to as a one-dimensional Euclidean algorithm. The one-dimensional Euclidean algorithm is a method of finding the greatest common divisor of a pair of integers. For example, the greatest common divisor of 15 and 36 is determined here. The smaller number of 15 and 36 is subtracted from the larger number. Then, 36−15=21. The subtraction operation results in 21. Next, the smaller number of the pair of the smaller number of 15 and 36, i.e., 15 and 21 is subtracted from the larger number. Then, 21−15=6. This operation is repeated. The series of calculations is written as below.

$$(36,15) \Rightarrow (21,15) \Rightarrow (15,6) \Rightarrow (9,6) \Rightarrow (6,3) \Rightarrow (3,3) \Rightarrow (3,0)$$

The algorithm ends when 0 finally appears. Of the remaining pair of 0 and the other number, the other number is the greatest common divisor. The one-dimensional Euclidean algorithm has been described.

The one-dimensional Euclidean algorithm is extended to a complex number. The algorithm to which the one-dimensional Euclidean algorithm is extended is the two-dimensional Euclidean algorithm. A method described herein is to calculate a "base vector (or an irreducible vector)" corresponding to the greatest common divisor of Gaussian integers if two complex numbers, each having an integer real part and an integer imaginary part (Gaussian integers), are present. As an example, the two-dimensional Euclidean algorithm is applied to two Gaussian integers of (3+i) and (−1+i).

A Gaussian integer of the pair of (3+i) and (−1+i) having a larger norm (absolute value) is added to a Gaussian integer that results from multiplying a Gaussian integer having a smaller norm of the pair by +1, −1, +i, and −i (the multiplication of the Gaussian integer by −1, +i, and −i is interpreted to mean that the Gaussian integer is rotated by +180 degrees, +90 degrees, and +270 degrees, respectively). Then, $$(3+i)+(+1)(-1+i)=2+2i$$

$$(3+i)+(-1)(-1+i)=4$$

$$(3+i)+(+i)(-1+i)=2$$

$$(3+i)+(-i)(-1+i)=4+2i$$

Among these four values (2+2i, 4, 2, 4+2i), the Gaussian integer having the smallest norm is 2. The same operation is performed on one of 3+i and −1+i, whichever has a smaller norm, and 2.

Then, $$2+(+1)(-1+i)=1+i$$

$$2+(-1)(-1+i)=3-i$$

$$2+(+i)(-1+i)=1-i$$

$$2+(-i)(-1+i)=3+i$$

Among these four values, the Gaussian integers having the smallest norm are 1+i and 1−i. If two or more Gaussian integers have the same norm, whichever may be used. For example, 1+i is selected here, and the same operation is performed on −1+i and 1+i.

$$(-1+i)+(+1)(1+i)=2i$$

$$(-1+i)+(-1)(1+i)=-2$$

$$(-1+i)+(+i)(1+i)=-2+2i$$

$$(-1+i)+(-i)(1+i)=0$$

(If the two Gaussian integers have the same norm, whichever may be multiplied by +1, −1, +i, and −i).

Since 0 appears, 1+i or −1+i corresponds to the greatest common divisor of the one-dimensional Euclidean algorithm (referred to as the "irreducible vector"). The two-dimensional Euclidean algorithm has been described.

The present embodiment features the DMRS channel estimation through the two-dimensional Euclidean algorithm. The principle of the channel estimation is described below. The DMRS serving as a reference in the present embodiment has to be one of the points of the QPSK signal.

Figure 8:
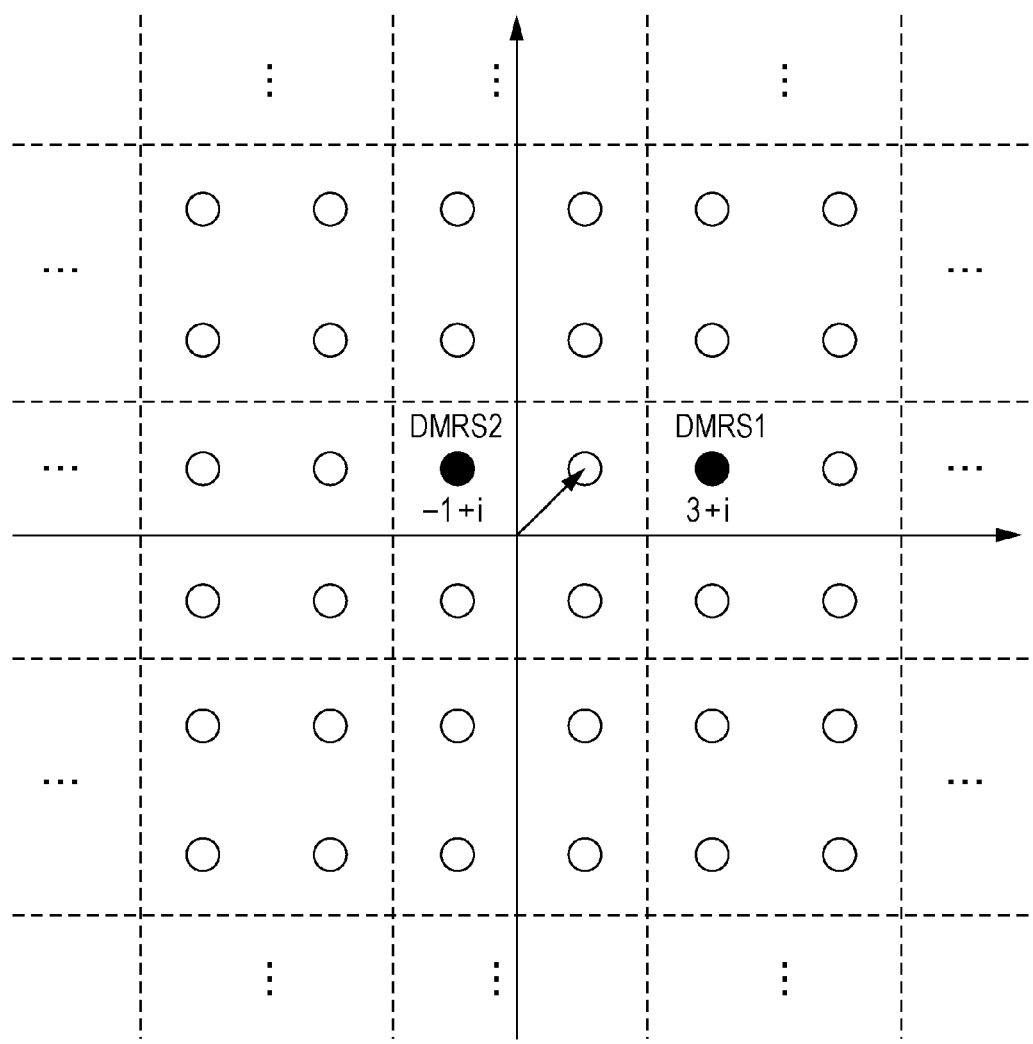
FIG. 8 illustrates examples of positions of two DMRSs (DMRS 1 and DMRS 2) indicated on a signal point plane.

FIG. 8 illustrates an example of the positions of two DMRSs (referred to as DMRS 1 and DMRS 2) in a signal point plane. The base-station apparatus may now transmit the DMRS 1 at position 3+i, and the DMRS 2 at position −1+i, for example. The unit of the signal point plane is set so that the amplitude of the QPSK signal is $2^{1/2}$. More specifically, the signal points of the QPSK signal are (±1±i), and the modulo width is 4 (for convenience of explanation, the unit of amplitude has changed from that of the first embodiment). All of solid circles denoting the DMRS 1 and the DMRS 2 and blank circles other than the solid circles are QPSK signal points and points resulting from adding any perturbation vector to the QPSK signal points. The DMRS 1 is a signal that results from adding a perturbation vector +4 to −1+i of the QPSK signal.

If the two-dimensional Euclidean algorithm is performed on 3+i and −1+i, a complex number 1+i as the "greatest common divisor" is obtained. This means that a minimum lattice vector (irreducible vector) of a lattice point group (solid circles and blank circles) of FIG. 8 is calculated. The irreducible vector corresponds to one of the four QPSK points. If a common factor "a" to complex numbers is multiplied such as a(3+i) and a(−1+i) in original signals, the irreducible vector is also multiplied by a, resulting in an irreducible vector a(1+i).

In the mobile-station device, the DMRS 1 and the DMRS 2 are multiplied by a complex gain of the channel, namely, h(3+i) and h(−1+i). Noise is disregarded herein. If the two-dimensional Euclidean algorithm is applied to the two signals, the irreducible vector h(1+i) results. This signal is obtained by multiplying the complex gain of the channel by one of the four QPSK points to which no perturbation vector is added. Since it is known that each of the QPSK points has a norm of $2^{1/2}$, the absolute value |h| of the complex gain of the channel can be determined. Also, since arg (h) can be determined, the phase of the complex gain of the channel can also be determined.

However, the mobile-station device has difficulty in determining which of the four QPSK points ($\pm 1 \pm i$) multiplied by h results in the signal h(1+i) obtained through the two-dimensional Euclidean algorithm unit during the DMRS channel estimation. The phase arg(h) is thus determined on a tentatively selected point (1+i). If the point multiplied by h is one of the other three points (−1+i), (1−i), and (−1−i), the actual phase difference of the complex gain is definitely one of +90 degrees, +180 degrees, and +270 degrees.

The modulo operation is then performed on the DMRS 1 and the DMRS 2. The same modulo operations are performed on I-ch and Q-ch, and are symmetrical with respect to the corresponding axis, and are rotational symmetrical computation by 90 degrees. For this reason, if arg (h) is rotated by an integer multiple of 90 degrees, the modulo operation is performed on each of the DMRS 1 and the DMRS 2 without any problems.

The DMRS 1 subsequent to the modulo operation is h(1+i), and the DMRS 2 subsequent to the modulo operation is h(−1+i). If noises μ1 and μ2 are considered, the DMRS 1 becomes h(1+i)+μ1, and the DMRS 2 becomes h(−1+i)+μ2. Since the mobile-station device has known that the DMRS 1 is (1+i) and the DMRS 2 is (−1+i) prior to the non-precoding operation, the mobile-station device performs the channel estimation from each DMRS as below.

$$\{h(1+i)+\mu 1\}/(1+i)=h+\mu 1/(1+i)$$

$$\{h(-1+i)+\mu 2\}/(-1+i)=h+\mu 2/(-1+i)$$

Here, μ1/(1+i) and μ2/(−1+i) are channel estimation errors, and can be reduced by maximum ratio combining the channel estimation results of the DMRS 1 and the DMRS 2.

Figure 9:
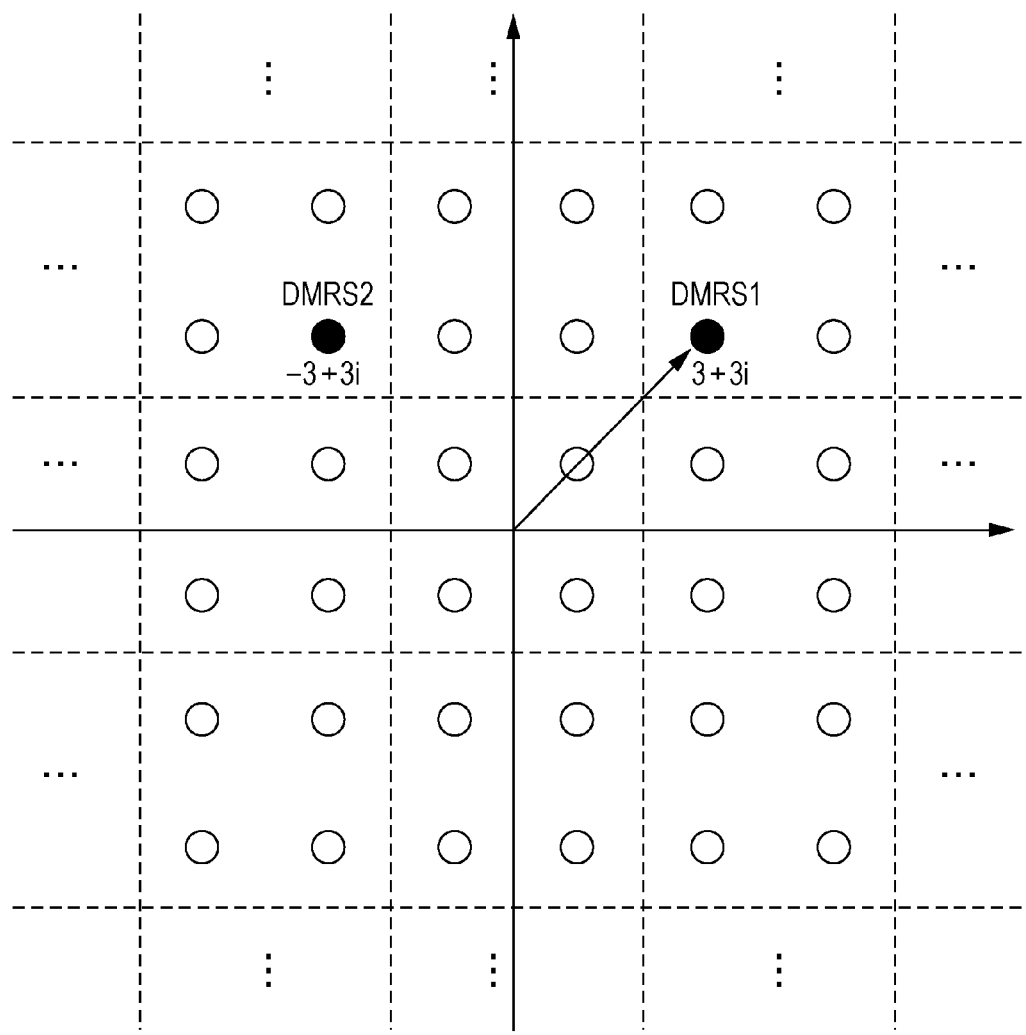
FIG. 9 illustrates examples of positions on the signal point plane where an irreducible vector fails to match a signal point of QPSK.

It should be noted herein that h($\pm 1 \pm i$) corresponding to the irreducible vector cannot be calculated through the two-dimensional Euclidean algorithm in a combination of some DMRSs. If the DMRSs are arranged as illustrated in FIG. 9, the irreducible vector is 3+3i, and fails to match the signal point of QPSK. To avoid such a case, the base-station apparatus predicts the case of FIG. 9 through the two-dimensional Euclidean algorithm, and then changes the signal points and transmits points free from such a problem.

The overview of the two-dimensional Euclidean algorithm of the present embodiment has been discussed. This process is described again referring to FIG. 10 that illustrates the two-dimensional Euclidean algorithm. As described above, the two-dimensional Euclidean algorithm unit 300 is present both in the base-station apparatus and the mobile-station device. The two-dimensional Euclidean algorithm unit of the mobile-station device is described first.

Figure 10:
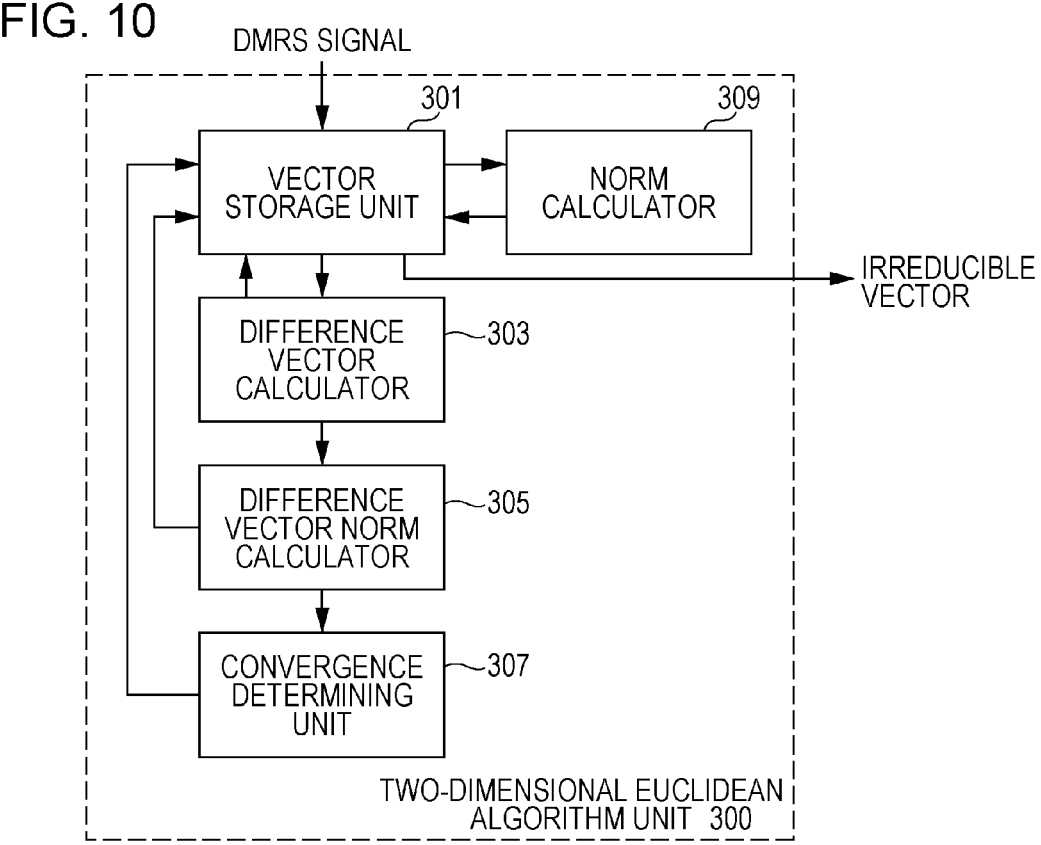
FIG. 10 illustrates a configuration example of a two-dimensional Euclidean algorithm unit.

The two-dimensional Euclidean algorithm unit 300 of FIG. 10 includes a vector storage unit 301, a difference vector calculator 303, a difference vector norm calculator 305, a convergence determining unit 307, and a norm calculator 309.

(Step S31) The vector storage unit 301 inputs the two input DMRSs to the norm calculator 309. The two DMRSs are obtained by multiplying the DMRS transmitted from the base-station apparatus by the complex gain h of the channel, and adding noise to the DMRS subsequent to the multiplication.

(Step S32) The norm calculator 309 calculates the norms of the two input DMRSs, and input each norm to the vector storage unit 301.

(Step S33) The vector storage unit 301 inputs the norms corresponding to the two input DMRSs to the difference vector calculator 303.

(Step S34) Let "a" represent a vector having a larger norm out of the two input vectors and "b" represent a vector having a smaller norm (the signal obtained when the difference vector calculator 303 recursively performs a calculation on the two input DMRSs is hereinafter referred to as a "vector"). The difference vector calculator 303 calculates four vectors c1=a+b, c2=a−b, c3=a+ib, and c4=a−ib, and then inputs the four vectors to the difference vector norm calculator 305. The difference vector calculator 303 also inputs the norms of the vector b and the norm of the vector b to the vector storage unit 301.

(Step S35) The difference vector norm calculator 305 calculates the norms of the four input vectors c1 through c4, inputs the vector having the smallest norm and the norm of that vector to the vector storage unit 301, and inputs the norm of the vector having the smallest norm to the convergence determining unit 307.

(Step S36) The convergence determining unit 307 compares in magnitude the input norm with a predetermined positive value T. If the norm is larger than T, the convergence determining unit 307 inputs to the vector storage unit 301 information that the two-dimensional Euclidean algorithm has been completed.

The norm of 0 is not set as a convergence condition as opposed in the principle of the two-dimensional Euclidean algorithm because the DMRS contains noise in the mobile-station device and the norm of the convergence determining unit 307 does not end up with 0. However, the noise is typically smaller than the DMRS, and it is thus determined that convergence has reached when the norm becomes smaller than the predetermined constant T.

The value of T is a tradeoff of the following two factors, and is preset through computer simulation.

1) If T increases, the convergence determination condition is relaxed. Even when there is no error caused by the noise, the probability that the convergence determining unit 307 determines that the norm has converged even though the norm is not 0.

2) If T decreases, the convergence determination condition becomes rigorous. The convergence determining unit 307 determines that the norm has not converged because of an error caused by noise, although the convergence determining unit 307 should determine that the norm has converged.

The value of T is thus preset in view of the tradeoff of the two factors.

(Step S37) The vector storage unit 301 inputs to the difference vector calculator 303 two norms of 1) norm corresponding to a vector input from the difference vector calculator 303, and 2) norm corresponding to a vector input from the difference vector norm calculator 305, and repeats the process beginning with step S34.

(Step S38) Upon receiving from the convergence determining unit 307 information indicating that the two-dimensional Euclidean algorithm has been completed, the vector storage unit 301 outputs the vector b (irreducible vector).

Since the two-dimensional Euclidean algorithm unit 300 in the base-station apparatus has not multiplied the DMRS by the complex gain h of the channel and has not added noise to the DMRS, the convergence determining unit 307 sets a determination condition to be T=0.

Detail of DMRS Corrector a226

Figure 11:
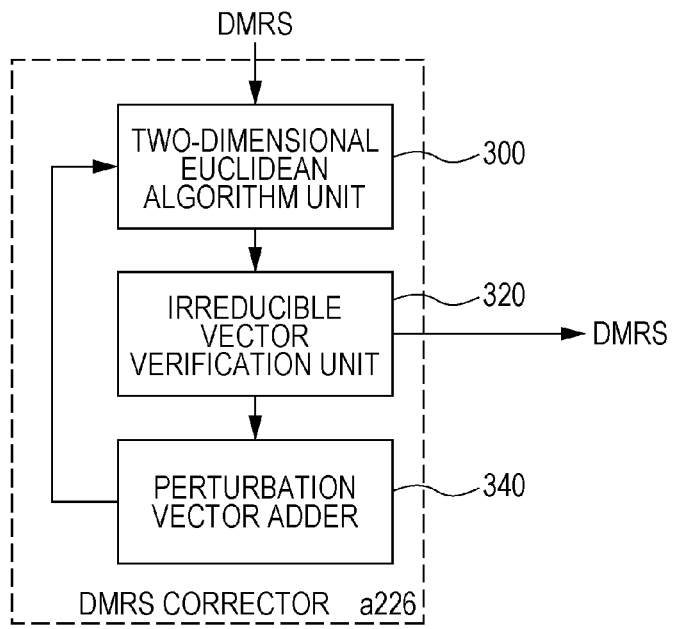
FIG. 11 illustrates a configuration example of a DMRS corrector.

Described next are the detailed configuration and operation of the DMRS corrector a226 in the base-station apparatus A2 that performs the two-dimensional Euclidean algorithm. FIG. 11 illustrates a configuration example of the DMRS corrector a226. The DMRS corrector a226 includes a two-dimensional Euclidean algorithm unit 300, an irreducible vector verification unit 320, and a perturbation vector adder 340.

The DMRS corrector a226 causes the base-station apparatus A2 to solve the problem that the irreducible vector fails to match the lattice vector, thereby precluding the problem.

The DMRS corrector a226 acquires the DMRS with the perturbation vector added thereto by the non-linear precoder a13. The DMRS acquired by the DMRS corrector a226 has the perturbation vector added thereto. A signal prior to adding a filter W is $(q+z1\tau+iz2\tau)$. The DMRSs acquired at a time is two, and the two are paired in advance. Which is paired with which is known by the base-station apparatus A2 and the mobile-station device B2n in advance.

The two-dimensional Euclidean algorithm unit 300 inputs to the irreducible vector verification unit 320 an irreducible vector resulting from applying the two-dimensional Euclidean algorithm to the two DMRSs (the irreducible vector is referred to "d") and the two DMRSs acquired from the non-linear precoder a13.

If the irreducible vector d is the DMRS signal q prior to the perturbation vector addition, i.e., one of the QPSK signals $(\pm 1 \pm i)$, the irreducible vector verification unit 320 again inputs the two DMRSs acquired from the non-linear precoder a13 to the non-linear precoder a13.

On the other hand, if the irreducible vector d is not the DMRS prior to the perturbation vector addition, i.e., not one of the QPSK signals $(\pm 1 \pm i)$, the irreducible vector verification unit 320 inputs the two DMRSs acquired from the non-linear precoder a13 to the perturbation vector adder 340.

The perturbation vector adder 340 adds the perturbation vector $\tau(-\tau, i\tau,$ or $-i\tau)$ to one of the two DMRSs acquired from the non-linear precoder a13. The perturbation vector adder 340 determines which of the DMRSs the perturbation vector $\tau$ is to be added to, in a random fashion using a random number. The perturbation vector adder 340 again inputs to the two-dimensional Euclidean algorithm unit 300 the two DMRSs including the DMRS with the perturbation vector added thereto.

The two-dimensional Euclidean algorithm unit 300 performs the two-dimensional Euclidean algorithm using new DMRSs. From then on, the two-dimensional Euclidean algorithm unit 300, the irreducible vector verification unit 320, and the perturbation vector adder 340 continuously perform the operations thereof until the irreducible vector verification unit 320 determines that the irreducible vector d is the DMRS prior to the perturbation vector addition, i.e., one of the QPSK signals $(\pm 1 \pm i)$.

Finally, the irreducible vector verification unit 320 outputs and then inputs the two corrected DMRSs to the non-linear precoder a13.

If the DMRS corrector a226 corrects the DMRS, the non-linear precoder a13 multiplies the DMRS by a filter W without searching for a new perturbation vector, and multiplies the resulting value by the reciprocal g of the power normalization coefficient g.

Detail of DMRS Channel Estimator b107

Described in detail below are the configuration and operation of the DMRS channel estimator b12 in the mobile-station device b2. FIG. 12($\alpha$) illustrates the DMRS channel estimator b12 in detail. The DMRS channel estimator b12 includes a two-dimensional Euclidean algorithm unit 300 and a complex gain calculator 350.

As illustrated in FIG. 12(b), the complex gain calculator 350 includes an interim complex gain calculator 351, a DMRS channel compensator 352, a DMRS-modulo unit 353, and a vector divider 354.

The DMRS channel estimator b12 first acquires the two DMRSs received by the mobile-station device B2n. The two DMRSs are a pair of DMRSs (referred to as $p_1$ and $p_2$) discussed with reference to the DMRS corrector a226 of the base-station apparatus.

The two-dimensional Euclidean algorithm unit 300 performs the two-dimensional Euclidean algorithm on the two DMRSs, thereby calculating an irreducible vector $p_{red}$. The irreducible vector $p_{red}$ is an irreducible vector already multiplied by the complex gain h, and is thus different from the irreducible vector d calculated by the DMRS corrector a226. As described above, the irreducible vector $p_{red}$ is a signal that has been obtained by multiplying one of the four QPSK signals with no perturbation vector added thereto by the complex gain h of the channel and by adding an error caused by noise to the multiplied signal.

The interim complex gain calculator 351 determines a phase $\theta$ $(=\arg(p_{red}/(1+i)))$ on the assumption that the irreducible vector $p_{red}$ is obtained by multiplying $(1+i)$ of the four QPSK signals by the complex gain (even if another point such as $(-1+i)$, $(1-i)$, and $(-1-i)$ is used, a phase difference of the actual complex gain is definitely one of +90 degrees, -90 degrees, or +180 degrees). Since each of the QPSK points has a norm of $2^{1/2}$, the absolute value $|h|(=pred/2^{1/2})$ of the complex gain of the channel can be determined. The interim complex gain calculator 351 inputs the absolute value $|h|$ $(=p_{red}/2^{1/2})$ and the phase $\theta$ of the complex gain of the channel $(=\arg(p_{red}/(1+i)))$ thus calculated to the DMRS channel compensator 352.

The DMRS channel compensator 352 performs a channel compensation on the DMRSs $p_1$ and $p_2$ using the input absolute value $|h|$ of the complex gain of the channel and the input phase $\theta$. More specifically, the amplitude of the DMRS is multiplied by $1/|h|$ and the phase is rotated by $-\theta$ as below.

$$q_1 = p_1/|h| \times \exp(-2\pi i \theta)$$

$$q_2 = p_2/|h| \times \exp(-2\pi i \theta)$$

The DMRS channel compensator 352 inputs to the DMRS-modulo unit 353 the channel-compensated DMRSs $q_1$ and $q_2$, the absolute value $|h|$ and the phase $\theta$ of the complex gain of the channel.

The DMRS-modulo unit 353 calculates signals $e_1$ and $e_2$ by performing the modulo operation on the input channel-compensated DMRSs $q_1$ and $q_2$. Since the DMRSs are channel-compensated for in terms of both amplitude and phase, the DMRS-modulo unit 353 can perform the modulo operation using the modulo width $\tau(=2 \times 2^{1/2})$ corresponding to a standard QPSK signal. The DMRS-modulo unit 353 calculates a signal $p_{mod1}(=|h| \times e_1 \times \exp(2\pi i \theta))$ and a signal $p_{mod2}(=|h| \times e_2 \times \exp(2\pi i \theta))$ based on the signals $e_1$ and $e_2$ subsequent to the modulo operation, using the absolute value $|h|$ and the phase $\theta$ of the complex gain of the channel. The DMRS-modulo unit 353 inputs the signals $p_{mod1}$ and $p_{mod2}$ to the vector divider 354.

The vector divider 354 estimates the complex gain h of the channel $(=p_{mod1}/q$ or $p_{mod2}/q)$ by dividing the signals $p_{mod1}$ and $p_{mod2}$ by a reference signal q of the DMRS received and learned in advance by the mobile-station device (the reference signal q is a signal point of the DMRS prior to the perturbation vector addition by the base-station apparatus and one of the four QPSK signal points). Since the two DMRSs are present, two measurement values are obtained with respect to the complex gain of the same channel. The error caused by the noise may be controlled by maximum ratio combining. The vector divider 354 inputs the complex gain h of the estimated channel to the channel compensator b106.

Advantageous Effects

As described with reference to the embodiment, each of the base-station apparatus A2 and the mobile-station device B2n performs the process of the two-dimensional Euclidean algorithm, and the DMRSs can be spatial multiplexed through NLP MU-MIMO using a relatively small amount of calculation on the mobile-station device B2n. The overhead involved in the insertion of the DMRS is reduced.

Third Embodiment

VP ⇒ THP, etc

Each of the mobile-station device B1n of the first embodiment and the mobile-station device B2n of the second embodiment performs VP with the non-linear precoder a13 and the filter calculator a11. A third embodiment uses THP that involves a smaller amount of calculation than VP. In the third embodiment, a base-station apparatus is referred to as a base-station A3, mobile-station devices are referred to as mobile-station devices B31 through B3N, and any of the mobile-station devices is referred to as a mobile-station device B3n.

In the third embodiment, a non-linear precoder is referred to as a non-linear precoder a33, and a filter calculator is referred to as a filter calculator a31.

The filter calculator a31 first QR decomposes H after calculating the channel matrix H in the same manner as in the first embodiment.

$$H^H = QR \qquad (3\text{-}1)$$

Here, R is an upper triangular matrix, and Q is a unitary matrix. Also, $^H$ means a complex conjugate transpose of a matrix. Let A represent a diagonal matrix including only diagonal components of $R^H$. A linear filter $P_0$ is calculated using A and Q in accordance with the following Expression.

$$P_0 = QA^{-1} \qquad (3\text{-}2)$$

Also, an interference coefficient filter F is calculated using A and R in accordance with the following Expression.

$$F = R^H A^{-1} - I \qquad (3\text{-}3)$$

Here, let I represent a unit matrix having N rows and N columns. Finally, the filter calculator a31 inputs the linear filter $P_0$ and the interference coefficient filter F to the non-linear precoder a33.

To perform the power normalization, the filter calculator a31 calculates the power normalization coefficient g in accordance with $$g = \text{trace}\{((P_0 C_v P_0^H)/P_{tr})^{1/2}\}$$

$$g = \{\text{trace}((P_0 C_v P_0^H)/P_{tr})\}^{1/2} \qquad (3\text{-}4)$$

Let $P_s$ represent the mean power of the modulation signal, and $P_v$ represent the mean power of the data signal subsequent to the modulo operation, and $C_v$ is a diagonal matrix having the diagonal components $$[P_s, P_v, P_v, \ldots, P_v] \qquad (3\text{-}5)$$

in the order from the top-left corner of the matrix. Note that $P_v$ changes in response to the modulo width τ. If $P_s=1$, $P_v$ is 4/3 with QPSK (τ=2×2$^{1/2}$), $P_v$ is 16/15 with 16QAM (τ=8×10$^{1/2}$) and $P_v$ is 64/63 with 64QAM (τ=16×42$^{1/2}$). This is based on the fact that the data signals after the modulo operation are uniformly distributed within the modulo width centered on the origin. The filter calculator a31 inputs to the non-linear precoder a33 as a new linear filter P a matrix that results from multiplying the linear filter $P_0$ calculated in Expression (3-2) by $g^{-1}$. The power normalization described with reference to the first embodiment is not performed then.

Figure 13:
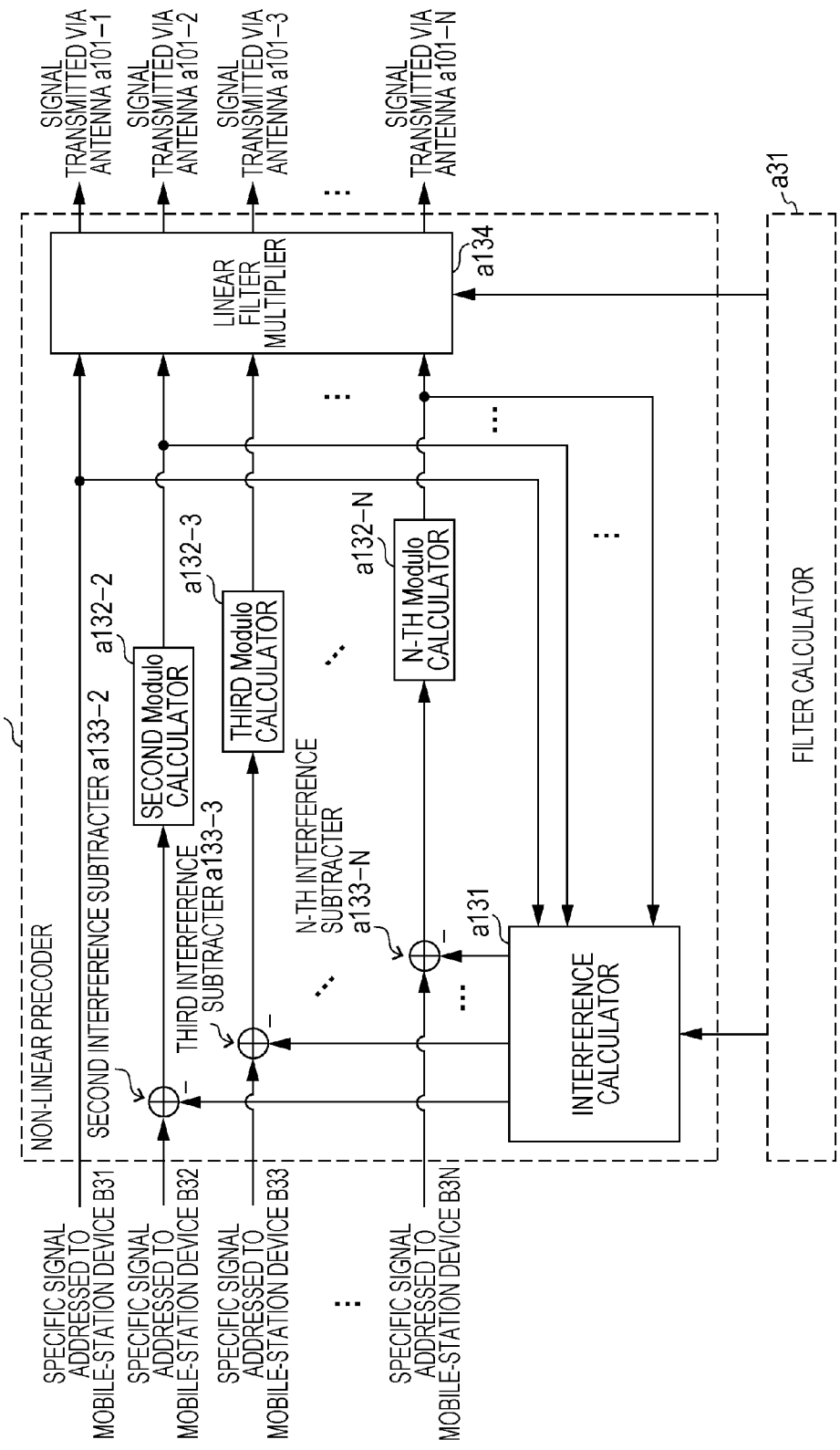
FIG. 13 illustrates a configuration example of a non-linear precoder.
Figure 14:
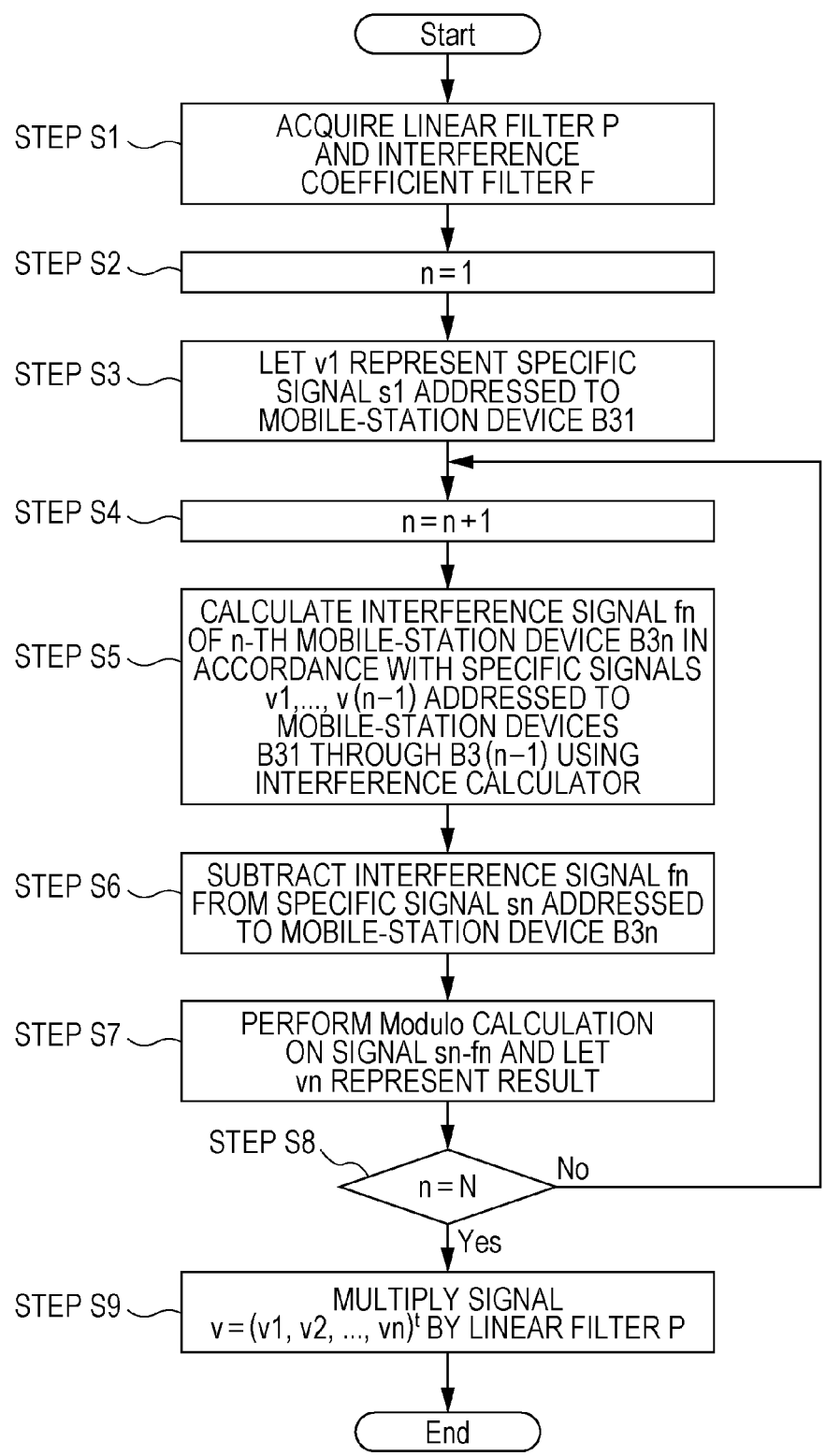
FIG. 14 is a flowchart illustrating an operation of the non-linear precoder.

FIG. 13 illustrates the configuration of the non-linear precoder a33 and FIG. 14 is a flowchart illustrating the operation of the non-linear precoder a33. The operation of the non-linear precoder a33 is sequentially described.

(Step S1) The interference calculator a131 and the linear filter multiplier a134 respectively acquire the interference coefficient filter F and the linear filter P from the filter calculator a31.

(Step S2) The non-linear precoder a33 substitutes 1 for n representing the number of a mobile-station device that is calculating the transmit signal.

(Step S3) The non-linear precoder a33 substitutes v1 for the specific signal s1 addressed to a mobile-station device B31.

(Step S4) The non-linear precoder a33 substitutes n+1 for n. In other words, n=2.

(Step S5) The interference calculator a131 calculates an interference signal f2 received by a mobile-station device B32, using v1, in accordance with the following Expression.

$$f2 = F(2,1)^* v1 \qquad (3\text{-}6)$$

where F(p, q) represents a component at a second row and a first column of the matrix F.

(Step S6) An interference subtracter a133-2 subtracts f2 from the specific signal s2 addressed to the mobile-station device B32, thereby calculating signal s2−f2.

(Step S7) A first modulo calculator a132-2 performs the modulo operation on s2−f2, thereby calculating a signal v2.

(Step S8) Since n=2, the process for the signal addressed to a next mobile-station device B33 is performed starting with step S4 (step S4 through step S7).

The operations in steps S4 through S8 are repeated until n=N. For example, the calculation of the signal addressed to an n-th mobile-station device B3n is described.

(Step S4) The non-linear precoder a33 increments the value of n by 1.

(Step S5) The interference calculator a131 calculates an interference signal fn received by the mobile-station device n using v1 through v(n−1) in accordance with the following Expression.

$$fn = F(n, 1{:}n{-}1)^* [v1, v2, \ldots, v(n{-}1)]^t \qquad (3\text{-}7)$$

where F(n, 1:n−1) represents a row vector indicating components at first column through (n−1)-th column at an n-th row of the matrix F.

(Step S6) An n-th interference subtracter a133-n subtracts fn from a specific signal sn addressed to the n-th mobile-station device B3n, thereby calculating sn−fn.

(Step S7) A modulo calculator a132-n performs the modulo operation on sn−fn, thereby calculating a signal vn. The modulo operation reduces transmit signal power addressed to each mobile-station device.

(Step S8) If n<N, the non-linear precoder a33 performs the operation in step S4 again. If n=N, processing proceeds to step S9.

(Step S9) Let x represent a signal resulting from multiplying a signal v=(v1, v2, ..., vN) by the linear filter P. As in the first embodiment, the components of the signal x are transmit signals sequentially transmitted via the antennas a101-1 through a101-N. The signal x is input to the frame constructor a142.

As VP, THP can also be considered to be a perturbation vector search algorithm as described below. However, THP is not an algorithm to search for a truly optimal perturbation vector but an algorithm to search for a quasi-optimal perturbation vector using an amount of calculation lower than that for VP.

The non-linear precoder a33 may now perform signal calculation based on the assumption that the non-linear precoder a33 includes none of the modulo calculators a132-1 through a132-N. If the power normalization coefficient is 1, the non-linear precoder a33 performs the following calculation.

$$x = P_0(I+F)^{-1}s \quad (3\text{-}8)$$

If Expressions (3-2) and (3-3) are substituted for $P_0$ and F, $$\begin{aligned}
x &= QA^{-1}\{I + (R^H A^{-1} - I)\}^{-1}s \quad (3\text{-}9)\\
&= QA^{-1}(R^H A^{-1})^{-1}s\\
&= Q(R^H)^{-1}s\\
&= (R^H Q^H)^{-1}s\{(QR)^H\}^{-1}s\\
&= \{(H^H)^H\}^{-1}s\\
&= H^{-1}s\\
&= Ws
\end{aligned}$$

$$\begin{aligned}
x &= QA^{-1}\{I + (R^H A^{-1} - I)\}^{-1}s\\
&= QA^{-1}(R^H A^{-1})^{-1}s\\
&= Q(R^H)^{-1}s\\
&= (R^H Q^H)^{-1}s\\
&= \{(QR)^H\}^{-1}s\\
&= \{(H^H)^H\}^{-1}s\\
&= H^{-1}s\\
&= Ws
\end{aligned}$$

This may be interpreted to mean that (z1, z2)=(0, 0) is substituted in Expression (1-2).

The modulo calculators a132-1 through a132-N add, to I-ch and Q-ch of the specific signal s, a signal of an integer multiple of the modulo width. For this reason, the signal x calculated by the non-linear precoder a33 of the present embodiment is also expressed by an expression x=W(s+z1τ+iz2τ). The signal x calculated by the non-linear precoder a33 is not necessarily a signal, expressed by Expression (1-2), with an optimal perturbation vector added thereto, but is a quasi-optimal signal x because power control through the modulo operation is performed thereon. If the modulo operation is not performed, the norm becomes definitely small in comparison with Ws.

The signal x is calculated in accordance with the above-described algorithm. Unlike VP in the first embodiment, searching for all the candidates of perturbation vectors becomes unnecessary. The amount of calculation is thus reduced. In this way, this arrangement minimizes an increase in the overhead involved in the DMRS insertion by spatial multiplexing DMRS in the NLP MU-MIMO system while the mobile-station device can normally estimate the complex gain of the data signal.

The quasi-optimal perturbation vector search algorithm using THP has been discussed. The same is true of THP using ordering, or LR-THP.

In the embodiments, the present invention is not limited to the configurations and the like illustrated in the accompanied drawings. The configurations and the like may be modified appropriately within the scope where the effects of the present invention are provided. The configurations and the like may be appropriately modified without departing from the scope of the present invention.

A program to perform the functions described with reference to the embodiments may be recorded on a computer-readable recording medium. The program recorded on the recording medium may be installed onto a computer system, and the computer system may execute the program. The process of each element is thus performed. The term "computer system" includes OS, and hardware such as a peripheral device.

The "computer system" includes a homepage providing environment (or display environment) if a WWW system is used.

The term "computer readable recording medium" refers to a portable medium, such as a flexible disk, a magneto-optical disk, ROM, or CD-ROM, or a recording device, such as a hard disk, built into the computer system. The "computer readable recording medium" may include a communication line that holds dynamically the program for a short period of time. The communication line transmits the program via a communication channel such as a network like the Internet or a telephone line. The "computer readable recording medium" may also include a volatile memory in the computer system that may be a server or a client and stores the program for a predetermined period of time. The program may implement part of the above-described function. The part of the above-described function may be used in combination with a program previously recorded on the computer system.

INDUSTRIAL APPLICABILITY

The present invention finds applications in communication apparatuses.

REFERENCE SIGNS LIST

A1 ... base-station apparatus, B11-B14 ... mobile-station devices, a11 ... filter calculator, a13 ... non-linear precoder, a31 ... filter calculator, a33 ... non-linear precoder, a101 ... antenna, a102 ... receiver, a103 ... GI remover, a104 ... FFT unit, a105 ... channel state information acquisition unit, a121 ... encoder, a122 ... modulator, a124 ... DRMS generator, a125 ... specific signal constructor, a133 ... interference subtracter, a132 ... modulo calculator, a134 ... linear filter multiplier, a141 ... CRS generator, a142 ... frame constructor, a143 ... IFFT unit, a144 ... GI inserter, a145 ... transmitter, a226 ... CRS corrector, b12 ... DMRS channel estimator, b101 ... antenna, b102 ... receiver, b103 ... GI remover, b104 ... FFT unit, b105 ... signal separator, b106 ... channel compensator, b107 ... CRS channel estimator, b108 ... channel state information generator, b109 ... modulo calculator, b110 ... demodulator, b111 ... decoder, b121 ... perturbation vector candidate selector, b122 ... perturbation vector adder, b123 ... interim channel estimating unit, b124 ... channel compensating unit, b125 ... modulo calculator, b126 ... demodulator, b127 ... perturbation vector evaluation value calculator, b128 ... perturbation vector estimating unit, b131 ... IFFT unit, b132 ... GI inserter, b133 ... transmitter, 300 . . . two-dimensional Euclidean algorithm unit, 301 . . . vector storage unit, 303 . . . difference vector calculator, 305 . . . difference vector norm calculator, 307 . . . convergence determining unit, 309 . . . norm calculator, 320 . . . irreducible vector verification unit, 340 . . . perturbation vector adder, 350 . . . complex gain calculator, 351 . . . interim complex gain calculator, 352 . . . DMRS channel compensator, 353 . . . DMRS-modulo unit, 354 . . . vector divider All the publications, patents and patent applications cited in this description are incorporated by reference in their entirety herein.

The invention claimed is:

1. A receiver apparatus comprising:
   a perturbation vector adder that adds a perturbation vector candidate that is an integer multiple of a predetermined width to a demodulation reference signal; and
   an interim channel estimator that estimates a channel in accordance with the demodulation reference signal with the perturbation vector candidate added thereto.

2. The receiver apparatus according to claim 1, comprising a perturbation vector candidate selector that selects a plurality of different pieces of the perturbation vector candidate; and
   a perturbation vector estimator that selects one of a plurality of the perturbation vector candidates in accordance with a channel estimation result estimated by the interim channel estimator that estimates the channel using each of the plurality of perturbation vector candidates.

3. The receiver apparatus according to claim 1, comprising:
   a demodulator that calculates a logarithmic likelihood ratio of a data signal of each of the channel estimate results corresponding to the plurality of different pieces of the perturbation vector candidate, and
   a perturbation vector evaluation value calculator that calculates a variance of each logarithmic likelihood ratio,
   wherein the perturbation vector estimator selects the signal corresponding to the largest one of the variances.

4. The receiver apparatus according to claim 1, comprising two-dimensional Euclidean algorithm circuitry that applies the two-dimensional Euclidean algorithm to a plurality of demodulation reference signals to calculate an irreducible vector.

5. The receiver apparatus according to claim 1, comprising a complex gain calculator that calculates a complex gain of a channel using the irreducible vector.

6. A reception method comprising the steps of:
   adding a perturbation vector candidate that is an integer multiple of a predetermined width to a demodulation reference signal;
   estimating a channel in accordance with the demodulation reference signal with the perturbation vector candidate added thereto;
   calculating a logarithmic likelihood ratio of a data signal of each of the channel estimate results corresponding to a plurality of different pieces of the perturbation vector candidate;
   calculating a variance of each logarithmic likelihood ratio; and
   selecting the perturbation vector candidate corresponding to the largest one of the variances.

* * * * *